United States Patent
Kuramasu

(10) Patent No.: US 6,961,111 B1
(45) Date of Patent: Nov. 1, 2005

(54) DISPLAY DEVICE AND METHOD OF PRODUCING SAME

(75) Inventor: Keizaburo Kuramasu, Kyotanabe (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 569 days.

(21) Appl. No.: 09/831,315

(22) PCT Filed: Aug. 31, 2000

(86) PCT No.: PCT/JP00/05945

§ 371 (c)(1),
(2), (4) Date: May 8, 2001

(87) PCT Pub. No.: WO01/18596

PCT Pub. Date: Mar. 15, 2001

(30) Foreign Application Priority Data

| Sep. 8, 1999 | (JP) | 11-254389 |
| Sep. 13, 1999 | (JP) | 11-259304 |

(51) Int. Cl.[7] ......................................... G02F 1/1345
(52) U.S. Cl. .................... 349/152; 349/149; 349/151; 349/154; 349/189; 349/190; 349/153; 349/58; 349/65; 349/138; 349/42
(58) Field of Search ............................. 349/150, 151, 349/152, 157, 43, 149, 154, 189, 190, 153, 349/58, 65, 138, 42; 257/207, 204, 205, 72; 345/206

(56) References Cited

U.S. PATENT DOCUMENTS

| 4,928,164 A | * | 5/1990 | Tanizawa ..................... 257/205 |
| 5,250,931 A | * | 10/1993 | Misawa et al. ............. 345/206 |
| 5,365,091 A | * | 11/1994 | Yamagishi ................... 257/203 |
| 6,226,060 B1 | * | 5/2001 | Onisawa et al. .............. 349/43 |
| 6,271,543 B1 | * | 8/2001 | Ohtani et al. ................. 257/72 |
| 2002/0053673 A1 | * | 5/2002 | Misawa et al. ............... 257/72 |

FOREIGN PATENT DOCUMENTS

| JP | 61-026025 | 2/1986 |
| JP | 3-98082 | 4/1991 |
| JP | 4-3552 | 1/1992 |
| JP | 4-14022 | 1/1992 |
| JP | 4-250424 | 9/1992 |
| JP | 6-163583 | 6/1994 |
| JP | 8-248431 | 9/1996 |
| JP | 9-230362 | 9/1997 |
| JP | 9-274195 | 10/1997 |
| JP | 9-304793 | 11/1997 |
| JP | 10-268343 | 10/1998 |

* cited by examiner

Primary Examiner—Nathan J. Flynn
Assistant Examiner—Fazli Erdem
(74) Attorney, Agent, or Firm—Steptoe & Johnson LLP

(57) ABSTRACT

A driver circuit-integrated type active matrix substrate 212 has, on a glass substrate 210, a liquid crystal display unit 221 including a matrix array composed of thin film transistors, and driver circuits 224–226 for driving the liquid crystal display unit. A peripheral portion of the glass substrate 210 has recessed grooves 260–263 formed therein, and power supply lines 251–254 for supplying power to the driver circuits 225 and 226 are buried in the recessed grooves. Such a configuration reduces the resistance of bus wiring lines such as the power supply lines for the driver circuits and data lines, without increasing an area of the peripheral portion. The driver circuit-integrated type active matrix substrate reduces an amount of voltage drop in power supply voltage, ensuring reliable operation of the driver circuits.

24 Claims, 37 Drawing Sheets

Fig. 10
(A) After The Formation of ITO
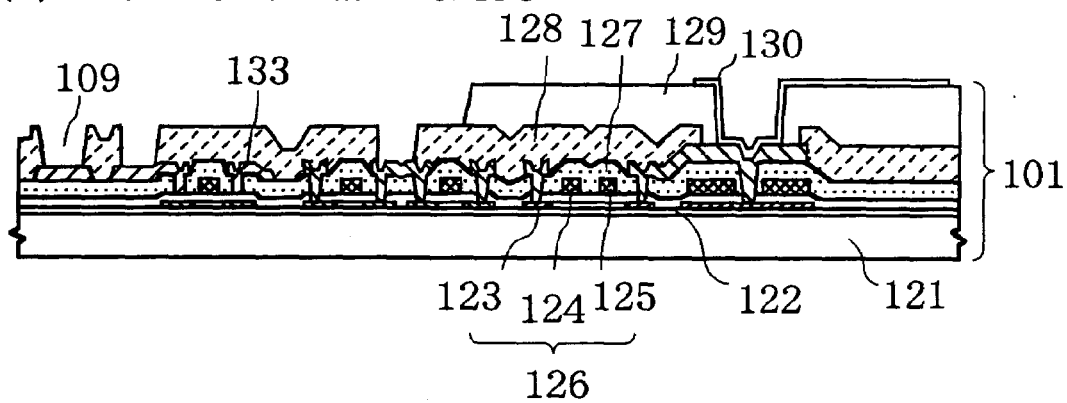
(B) After The Printing of Bus Line Electrode
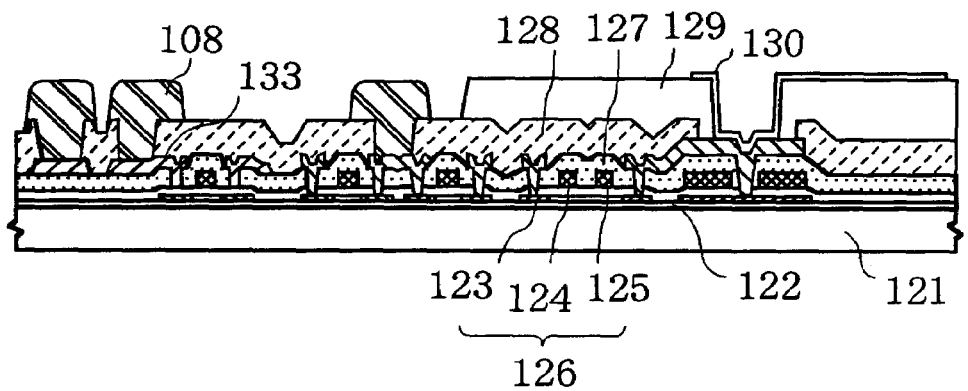
(C) After The Formation of Printed Protective Film
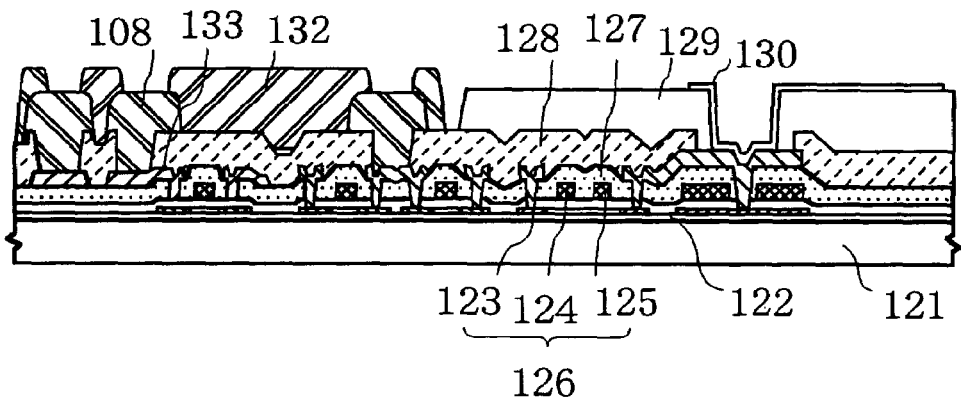

Fig. 11
(A) After The Formation of ITO
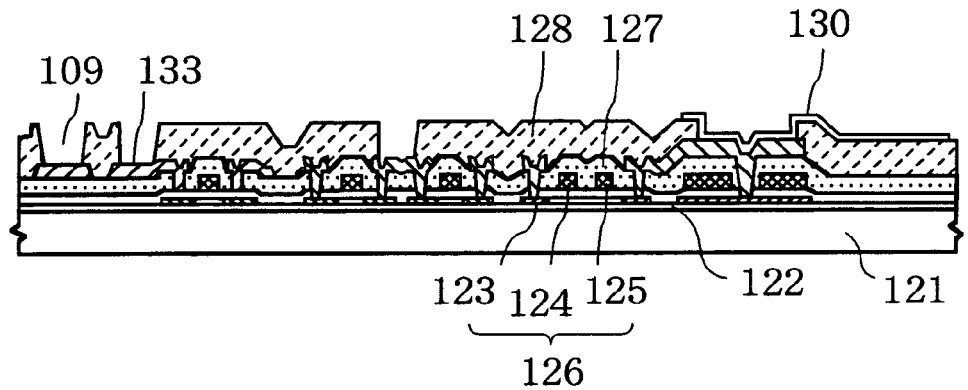
(B) After The Printing of Insulating Film
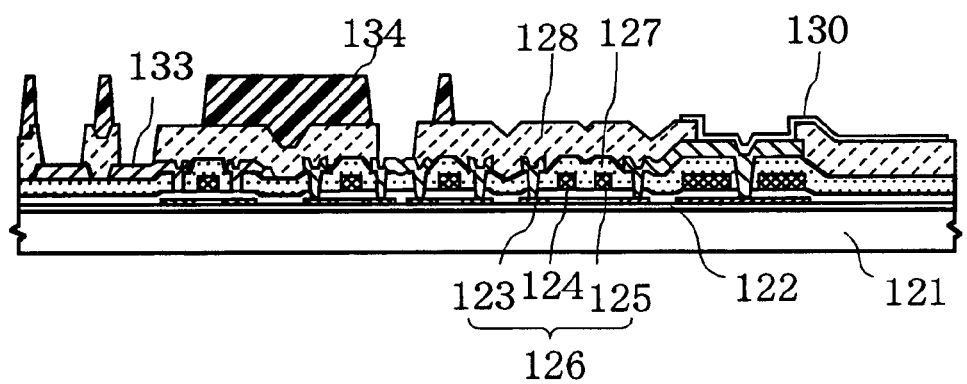
(C) After the Formation of Bus Line Electrode
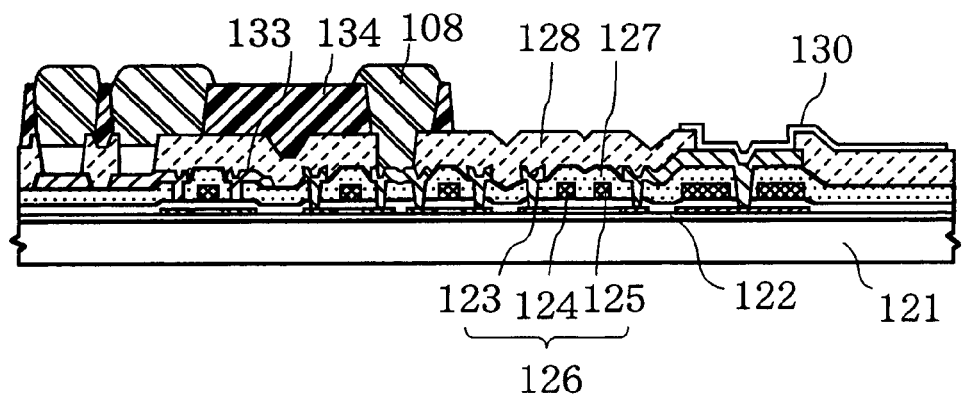

Fig. 12
(A) After The Formation of ITO
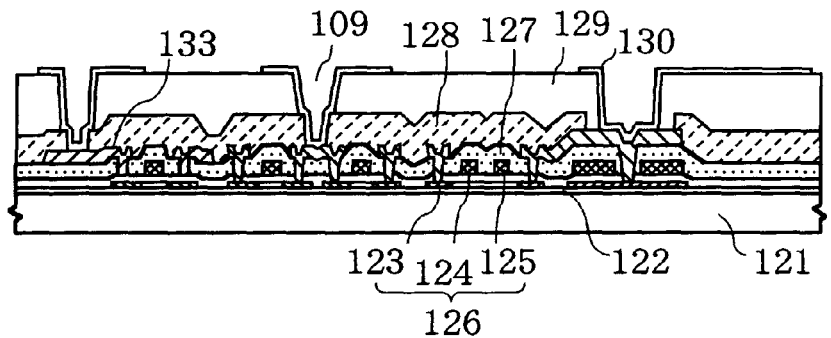
(B) After The Formation of Bus Line Electrode
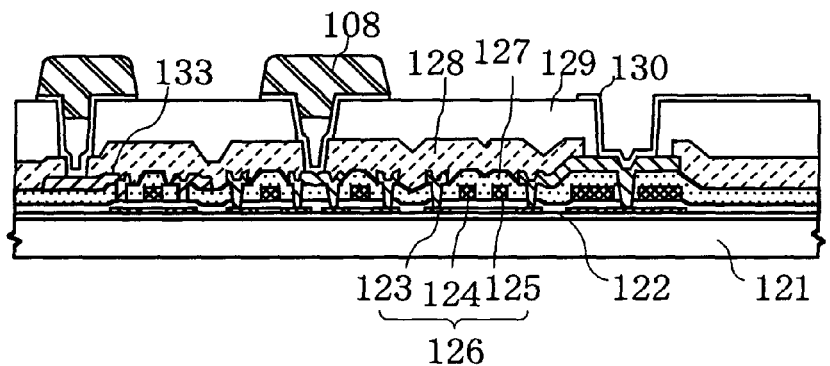
(C) After The Formation of Printed Protective Film
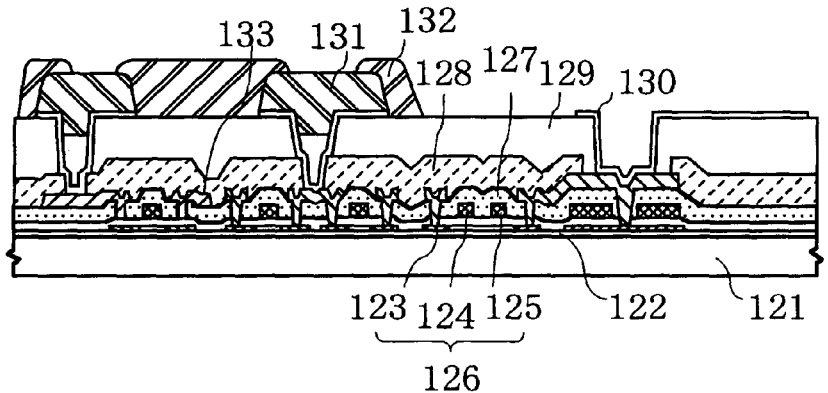

Fig. 34
(a)
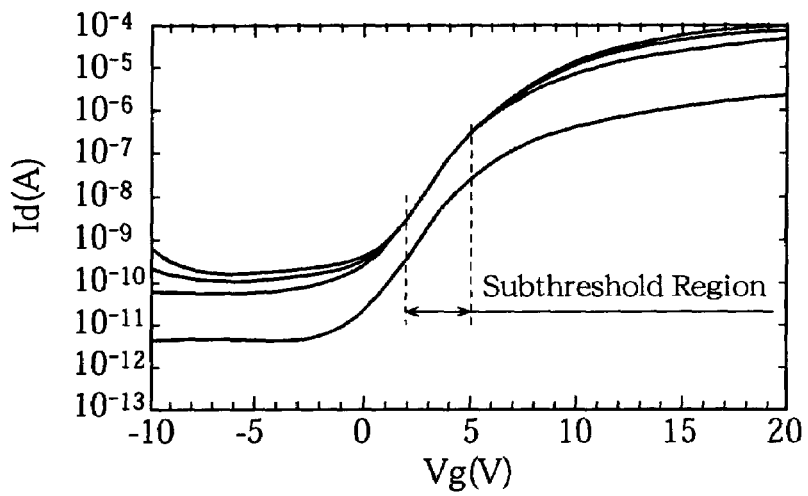
Characteristics of Polysilicon TFT
(b)
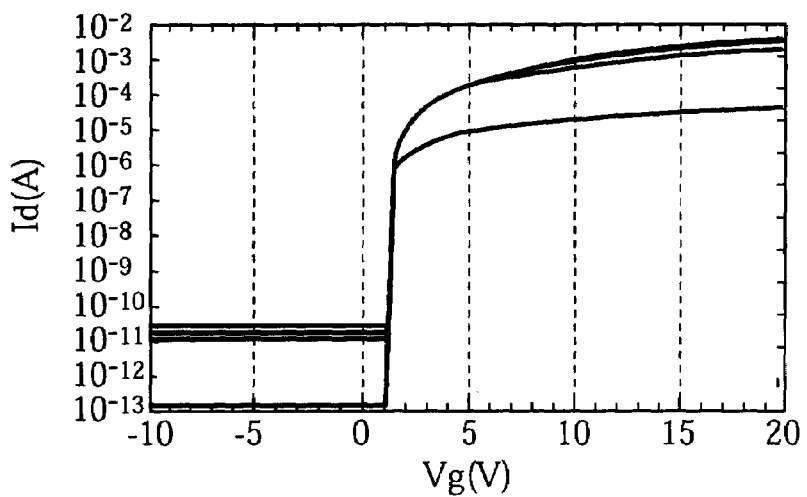
Characteristics of Mos-Tr ( Crystalline Silicon )

DISPLAY DEVICE AND METHOD OF PRODUCING SAME

TECHNICAL FIELD

The present invention relates to a display device and a method of producing the device, more particularly to a structure of the connection between an integrated driver circuit section formed on an array substrate and bus lines such as a power supply line for supplying electric power to the integrated driver circuit section or a data line for supplying data thereto.

BACKGROUND ART

Background Art—I

In a conventional active matrix type liquid crystal display device employing amorphous silicon (hereafter referred to as "a-Si") transistors, a-Si has been considered sufficient to meet the performance requirements for driving the pixels. However, using a-Si, integrating a signal driver circuit on the very substrate on which the pixels are formed is difficult because of the characteristics of a-Si. For this reason, the display panel is usually driven by an external driver circuit (also simply referred to as a driver) formed by using single crystal Si.

In such a device, it is necessary to connect IC chips in the driver to the array substrate. An example of a technique for the connecting is the tape carrier package (TCP), as shown in FIG. 31, in which a driver 302 is mounted on a tape carrier film 301 so as to be connected to an array substrate 303 of the liquid crystal display panel.

In order to achieve a reduction in the thickness and weight of the device, the chip on glass (COG) technique, in which a driver is directly mounted on a liquid crystal panel, has been suggested. This technique eliminates the tape carriers and accordingly achieves cost reduction. In addition, the total number of the connections in a liquid crystal panel, including the connections with drivers, is reduced to ⅓ to ⅕ of that in TCP, resulting in an increase in reliability. This technique is illustrated in FIG. 32.

Although the number of connections of the driver IC chips is smaller in COG than that in TCP, COG also requires a high precision mounting process to connect a large number of terminals, which makes it difficult to achieve a significant increase in reliability and a remarkable reduction in manufacturing costs.

Unlike liquid crystal display devices using amorphous silicon TFTs for the switching elements of the active matrix, liquid crystal display devices employing polysilicon TFTs (hereafter referred to as p-Si TFTs) exhibit a mobility of the semiconductor layer at least 10 times to 100 times higher than that of a-Si (see SID 97, p. 171) and therefore make it possible to integrally form both active matrix elements for the display and portions of or all of signal driver circuits on a glass substrate at one time.

The driver circuit comprises, for example, shift registers, latches, and so forth, formed by a multiplicity of CMOS (Complimentary Metal Oxide Semiconductor) inverters, each composed of a p-channel TFT 304 and an n-channel TFT 305 as shown in FIG. 33. The wiring lines connecting the p-channel TFTs 304, the power supply lines, and the image signal lines are composed of, for example, an aluminum thin film that is formed on the glass substrate and has a thickness of about 7000 Å.

In the prior art liquid crystal display device, owing to the characteristics of p-Si TFT and line resistance of the power supply line, a voltage drop occurs in the power supply voltage, which is supplied to the shift resisters and so forth. Therefore, the prior art liquid crystal display device has such a drawback that unless the width of the power supply line is made fairly large or the power source voltage is made fairly high, the driver circuit does not properly operate.

As mentioned above, p-Si TFTs can achieve a higher operation speed than a-Si TFTs. However, as shown in, for example, "Integrated driver circuits for active matrix liquid crystal displays," Displays Vol. 14, No. 2, 1993, pp. 104–114 (see FIGS. 34(a) and 34(b)), p-Si TFTs have a larger OFF current and a larger subthreshold region current than those in single crystal silicon transistors, which are generally used in IC chips. This is considered to be due to the hopping of carriers between grain boundary levels in polysilicon or due to the influence of fixed charge caused by ions present in the gate insulating layer (Memorandum No. UCB/ERL M93/82). For this reason, in a switching operation of the CMOS inverter, as a drain current increases in the subthreshold region, a larger shoot-through current occurs.

Referring now to FIG. 35, more specific details of the shoot-through current are illustrated below.

(1) When an input voltage (gate voltage) $V_{in}$ is 0 V, the p-channel TFT 304 is in an ON state and the n-channel TFT 305 is in an OFF state, and the output voltage $V_{out}$ becomes a high level ($5V=V_{dd}$). In this state, substantially no shoot-through current (DC path current) flows from the source of the p-channel TFT 304 to the drain of the n-channel TFT 305.

(2) During the period in which the input voltage $V_{in}$ increases and exceeds a threshold voltage $V_{th(n)}$ (voltage A) of the n-channel TFT 305 and reaches a voltage B, the p-channel TFT 304 maintains the ON state in a saturation region, while the n-channel TFT 305 is in a non-saturation region and a drain current corresponding to the input voltage $V_{in}$ starts to flow. Accordingly, the shoot-through current gradually increases, while the output voltage $V_{out}$ gradually decreases.

(3) During the period in which the input voltage $V_{in}$ further increases from the voltage B and reaches a voltage D, both p-channel TFT 304 and n-channel TFT 305 are in a non-saturation region and a drain current corresponding to the input voltage Vin flows therein. Accordingly, the shoot-through current reaches the maximum value at a voltage C, and the output voltage $V_{out}$ shows a sudden drop.

(4) When the input voltage Vin exceeds a voltage D, the p-channel TFT 304 is in a non-saturation region and a drain current corresponding to the input voltage Vin flows therein, while the n-channel TFT 5 is in a non-saturation region and substantially in a ON state. Accordingly, the shoot-through current reduces, and the output voltage $V_{out}$ asymptotically approaches a low level (0 V).

(5) When the input voltage $V_{in}$ exceeds the threshold voltage $V_{th(p)}$ (voltage E), the p-channel TFT 304 is turned to an OFF state and the n-channel TFT 305 an ON state. Accordingly, the output voltage $V_{out}$ becomes the low level (0 V) and substantially no shoot-through current flows therein.

Since such a shoot-through current occurs as described above, when the amount of the voltage drop caused by the line resistance of the power supply lines becomes 1.5 V or greater, margins of driving voltage for shift registers and latches become exceedingly small, making the driver circuits difficult to properly operate. Specifically, when a liquid crystal display device being 20 cm in diagonal size is required, a current of about 160 mA flows in a power supply line thereof In such a device, in order to control the voltage drop within 1.5 V or smaller, it is required that the wiring line resistance of the power supply line be about 9 Ω or lower. Therefore, when the sheet resistance of the power supply line is 0.1 Ω, the width of the wiring line needs to be 3.4 mm or larger per line, in order to ensure proper operation of the driver circuits.

Such a problem is more serious in the cases of liquid crystal display devices having a large number of display pixels and liquid crystal display devices capable of color display, since in these devices, the number of stages of shift registers is large and the voltage drop in the power supply voltage is accordingly large. Furthermore, although such a problem also arises both in liquid crystal display devices operated by analog image input signals and in those operated by digital image input signals, but especially the latter devices are more susceptible to the problem since they have, in addition to the shift registers, latch circuits and D-A converters corresponding to the bit number of the digital image signals and the shoot-through current is correspondingly large.

The above-described problem also exists in a so-called point-at-a-time driving type liquid crystal display device, in which image signal voltage is sequentially applied to the pixel electrodes, such as shown in Japanese Examined Patent Publication No. 4-3552, and in a line-at-a-time driving type liquid crystal display device, in which image signals for one horizontal period is retained and thereafter image signal voltages are applied to the pixel electrodes of the horizontal line at one time, such as shown in SID '96 Digest pp. 21–24.

Background Art-II

At present, liquid crystal display devices are widely used in such appliances as notebook computers and automobile navigation systems, and in the devices, further reduction in size and thickness is desired. In order to achieve the size and thickness reduction, the use of polycrystalline silicon thin film transistors, which makes it possible to integrate driver circuits in the array substrate, is considered effective to simplify the manner of connection of the driver circuits with external circuits.

Accordingly, in the following discussion referring to drawings, there are described a prior art device in which amorphous silicon thin film transistors are connected to driver ICs for driving the transistors by using flip chip technique and a prior-art connection technique for connecting a prior art device in which polycrystalline silicon thin film transistors are used to external circuits.

FIGS. 36 and 37 schematically show the configurations of a 5-inch liquid crystal display device having about 400 thousand pixels. FIG. 36 shows a plan view of a liquid crystal display device in which prior art amorphous silicon thin film transistors are connected to driver ICs by using a flip chip technique, and a cross-sectional view of the device taken along the line A–A' in the plan view. FIGS. 37(A) and 37(B) show a plan view of a liquid crystal display device in which the driver circuit is made of a polycrystalline silicon thin film and a cross-sectional view of the device taken along the line B–B".

In FIGS. 36(A), 36(B), 37(A), and 37(B), like parts are designated by like reference numerals. Reference numeral 401 indicates an array substrate, reference numeral 402 a counter substrate, reference numeral 402 a flexible wiring board, and reference numeral 411 a driver IC.

As shown in FIGS. 36(A) and 36(B), in a device in which ICs are connected using a flip chip technique, if an additional flexible wiring board were not provided, the pitches of the connections would be so small that they would be beyond the current state of the art, and therefore, flexible wiring boards are provided on opposing sides and are connected to a printed circuit board (not shown) to construct circuitry.

The device shown in FIGS. 37(A) and 37(B) has a driver circuit section formed of a polycrystalline silicon thin film. Unlike the prior art amorphous silicon thin film transistors, the signal circuit section can be formed on one side, and therefore only one flexible wiring board is required for the connection with the printed wiring board to construct the circuitry.

As described above, the prior art method in which amorphous silicon thin film transistors and driver ICs are connected using a flip chip technique requires two flexible wiring boards, which increases device costs, and moreover, since the device has such a configuration that both sides of the flexible wiring boards are connected by a printed wiring board disposed on the side of the backlight, the liquid crystal device becomes bulkier.

When the driver circuits are formed using polysilicon thin film transistors, the flexible wiring board is necessary only for one side because there are no restrictions in the connection pitches and accordingly cost reduction is possible to a certain degree. However, the flexible wiring board must be connected to a relatively large shaped printed circuit board, which requires that the printed wiring board be disposed on the backside of the device, and the problem that the liquid crystal device is bulky remains unsolved.

SUMMARY OF THE PROBLEMS IN THE PRIOR ART

In summary, in order to ensure proper operation of the driver circuits, there is a need for low resistance bus lines for supplying power and for supplying various other signals. In addition, there is a need for reduction in the size and thickness of a flexible wiring board for connecting the device with external circuits, thereby reducing the size and thickness of the display device.

DISCLOSURE OF THE INVENTION

In view of the foregoing and other problems in the prior art, it is an object of the present invention to provide a display device having a low resistance bus line formed therein, which can achieve a device size reduction and a device thickness reduction by reducing the size of a flexible wiring board for connecting the device to an external circuit. It is another object of the invention to provide a method of producing such a device.

In order to accomplish the foregoing and other objects of the invention, a resin substrate having a bus line is mounted on an active matrix substrate in one embodiment of the invention. In another embodiment, the bus line is formed on an active matrix substrate by printing. In further another embodiment, the bus line is buried in an active matrix substrate.

(1) Specific configurations of Embodiment 1 according to the invention are as follows.

In Embodiment 1 of the present invention, there is provided a display device comprising an active matrix substrate having a driver circuit section composed of a plurality of polycrystalline silicon thin film transistors, a counter substrate, a liquid crystal filled between the active matrix substrate and the counter substrate, and an individually-wired line array for supplying a clock signal, a data signal or electric power to a plurality of circuit elements comprised in the driver circuit section, wherein the individually-wired line array is extended to a peripheral portion of the active matrix substrate, the display device characterized in that: the peripheral portion of the active matrix substrate has an insulator having a via hole and a multi-layer bus line-equipped section having a bus line formed on the insulator, the bus line is connected to the individually-wired line array via the via hole, and the bus line has a connecting terminal for connecting the display device to an external circuit.

The above-described configuration makes it possible to form a low resistance bus line in a peripheral portion of the active matrix substrate. In addition, a connecting terminal to an external circuit is provided at a part of the bus line to reduce the size and thickness of the flexible wiring board.

For the multi-layer bus line equipped section, a preformed resin substrate may be used. The resin substrate has, of course, a bus line formed on the surface thereof, and a via hole formed in the interior thereof. For the material for the resin substrate, aramid-epoxy resin is preferable. As a conductive member in the via hole, a conductive paste may be used.

The resin substrate may have a multi-layer structure having a plurality of layers in which a bus line is provided on a surface of an inner layer thereof as well as on a surface of the uppermost layer thereof, and the bus lines are selectively connected to each other via a via hole formed in each of the layers to form a three-dimensional wiring structure. Such a multi-layer substrate allows more freedom in designing the bus line 12 to easily arrange a plurality of bus lines 12.

In addition, the electrically conductive paste may partially protrude from a lower opening of the via hole, and the active matrix substrate and the resin substrate may be bonded together with the protruding portion of the electrically conductive paste. Thereby, a bump terminal and a conductive adhesive may be eliminated.

In addition, the resin substrate and the active matrix substrate may be bonded with an adhesive composed of a material having thermoplastic property. Accordingly, when the resin substrate is secured to the active matrix substrate, the attachment and detachment can be carried out many times, ensuring an accurate alignment of the resin substrate and the active matrix substrate.

In addition, the adhesive may be an anisotropic conductive resin or a silver paste.

In addition, the resin substrate may be a film substrate and may be detachably bonded to the active matrix substrate. The film substrate has flexibility, which makes it easy to carry out the bonding work. Therefore, the alignment of the resin substrate and the active matrix substrate is made more accurate. It is preferable that the film substrate be made of a resin comprising polyimide or epoxy.

In addition, a semiconductor chip comprised in the external circuit may be mounted on the resin substrate and be connected to the bus line. This configuration eliminates the need for a flexible wiring board or a printed wiring board on which an external circuit is mounted.

In addition, the semiconductor chip may be buried in the via hole. Thereby, the surface of the resin substrate is planarized.

(2) Specific configurations of Embodiment 2 according to the present invention are as follows.

The multi-layer bus line-equipped section employs a bus line formed by printing, in place of the resin substrate. The insulator in the multi-layer bus line-equipped section is also formed by printing. Such a multi-layer bus line-equipped section formed by printing also achieves a cost reduction in the flexible wiring board and a device size reduction, as well as the case of using a resin substrate. Furthermore, printing has such an advantage that a low resistance conductive material can be formed only in a required region.

Specific methods of a liquid crystal display device according to Embodiment 2 are as follows.

In Embodiment 2, there is provided a method of producing a liquid crystal display device, comprising: forming a driver circuit section using a polycrystalline silicon thin film transistor; forming an insulating film on a thin film wiring region including the driver circuit section; forming a via hole by etching a prescribed portion of the insulating film by photolithography so that a prescribed portion of a wiring electrode of the driver circuit section is exposed; printing a prescribed pattern on the insulating film with an electrically conductive ink; and electrically connecting the pattern to the wiring electrode of the driver circuit section via the via hole.

In the above-described method, as the insulating film, a silicon nitride film or a silicon oxide film provided for protecting pixel sections and the driver circuit section is utilized, and therefore, it is not necessary to form an additional insulating film. In addition, by using an insulating film having good heat resistance, a curing temperature of the material to be printed can be made high, and therefore, further reduction in the resistance is achieved.

In Embodiment 2, there is also provided a method of producing a liquid crystal display device, comprising: forming a driver circuit section using a polycrystalline silicon thin film transistor; printing an insulating film for forming a via hole in a prescribed position in a thin film wiring region including the driver circuit section such that a portion of the thin film wiring electrode is exposed; printing a prescribed pattern using an electrically conductive ink; and electrically connecting the pattern with the wiring electrode of the driver circuit section via the via hole.

By employing the above-described method, in addition to the insulating film for protecting transistors in pixel sections and driver circuit sections, an insulating film having a low dielectric constant is provided, and thereby, adverse effects caused by a large current are prevented and a high performance liquid crystal display device is achieved.

In Embodiment 2, there is also provided a method of producing a liquid crystal display device, comprising: forming a driver circuit section using a polycrystalline silicon thin film transistor; forming a planarizing film over a pixel region and a thin film wiring line region including the driver circuit section by applying a transparent insulating film; providing a via hole at a plurality of a prescribed position in the thin film wiring line region and the pixel region by a photolithography and an etching process; patterning a transparent conductive film on a prescribed position of the planarizing film; and printing a wiring line for supplying electric power to the driver circuit over the planarizing film including the transparent conductive film.

In the above-described method, a planarizing film provided for the purpose of increasing an aperture ratio of the liquid crystal display device is also formed on the driver circuit section so as to be utilized as an insulating film, and at the same time, a transparent conductive film is formed for the electrical connection with the wiring electrodes of the driver circuit section, so that sufficient electrical conduction can be obtained even when the via holes have a very small size. Thus, the above-described method achieves a further device size reduction.

(3) Specific configurations of Embodiment 3 are as follows.

i) In Embodiment 3, there is provided a display device comprising an active matrix substrate having a driver circuit section composed of a plurality of polycrystalline silicon thin film transistors, a counter substrate, a liquid crystal filled between the active matrix substrate and the counter substrate, and an individually-wired line array for supplying a clock signal, a data signal or electric power to a plurality of circuit elements comprised in the driver circuit section, wherein the individually-wired line array is extended to a peripheral portion of the active matrix substrate, the display device characterized in that: the active matrix substrate has a recessed groove formed in the peripheral portion; and a bus line to be connected to the individually-wired line array is buried in the groove.

In this configuration, when a thickness of the bus line is increased by increasing a depth of the recessed groove, the wiring line resistance can be reduced and the voltage drop of the power supply voltage can be minimized. As s result, reliable operation of the driver circuit is achieved.

Moreover, wiring line resistance can be reduced without increasing an area of the peripheral portion of the active matrix substrate, which makes it possible to realize a liquid crystal display device having a narrow frame.

Furthermore, since the bus line is buried in the active matrix substrate, surface level irregularities are not caused on the connecting lines that connect the bus line to driver circuits and on the insulating film provided over the connecting lines, achieving the planarization of the substrate surface. Accordingly, it is made possible to produce a liquid crystal display device having a uniform cell gap.

For a method of burying bus lines in an active matrix substrate, it is possible to select options such as the following methods: a method in which a resist is applied on an active matrix substrate, physical etching of the active matrix substrate is carried out by sandblasting so as to form recesses, and thereafter the resist is removed to form metal wiring lines; or a method in which a glass is chemically etched using an etchant solution to provide recesses. Physical etching, such as a sandblasting method and the like, does not require complex production apparatuses and manufacturing cost is low, but it is inferior to a method using an etchant solution in terms of producing wiring lines with a very small width. In contrast, chemical etching using an etchant solution necessitates an expensive production apparatus and thus a large manufacturing cost but is superior to a sandblasting method in terms of the precision in the etching.

ii) In Embodiment 3, the active matrix substrate may have an organic resin layer in the peripheral portion thereof, and a bus line to be connected to the individually-wired line array may be buried in the organic resin layer.

By employing such a configuration, because of the buried wiring structure, the wiring line resistance can be reduced without increasing the area of the peripheral portion of the active matrix substrate, thus achieving a liquid crystal display device having a narrow frame as in the embodiments mentioned above.

In addition, the resin layer serves as a planarizing layer, thus achieving a liquid crystal display device having a uniform cell gap, as in the embodiments mentioned above.

In addition, when a photosensitive material is used for the resin material, the need for coating a resist is eliminated, and the processability is improved in comparison to a glass substrate. In addition, the organic resin may be coated only on a required region, such as on the peripheral region, by using a screen. In addition, as metal wiring lines to be buried in the resin, a conductive thermosetting resin may be used and the wiring lines may be printed using a screen.

iii) In addition to the above two configurations, the wiring line to be buried may be a metal fine wire, in place of a thin film or a thick film.

iv) In addition, in order to further reduce the resistance of the bus line, plating may be employed as a means for increaseing the film thickness. Suitable materials for the plating may include copper plating, nickel plating, chromium plating, and aluminum plating, which are effective to reduce the resistance. A plating of alloys thereof may also be employed. Further, when the bus line produced by plating forms a layered structure comprising a copper foil layer, a copper plating layer, and a gold-nickel plating layer, the formation of stable wiring lines is possible.

v) By employing a buried wiring structure, the resistance value of the bus lines is remarkably reduced. The reason is discussed below. For example, in a liquid crystal panel being 20 cm in diagonal size, a current flowing in a power supply line to shift registers in the driver circuit utilizing polysilicon is about 800 mA. Accordingly, if the power supply line is made of Al, which is generally used as a low resistance wiring material in production processes of liquid crystal panels, in order to control the voltage drop of the power supply line within 1.5 V or lower, it is necessary that the wiring resistance be 1.8 $\Omega$ or lower. Assuming the sheet resistance of Al 0.1 $\Omega/\square$, the total width of the wiring lines including both plus and minus lines should be about 13 mm. However, if a plating process is employed, for example, it is easy to produce a wiring line having a film thickness of 1–10 $\mu$m, and for example, when the film thickness of Al is made 4 $\mu$m, the sheet resistance can be reduced to 0.01 $\Omega/\square$. If the wiring line width is about 4–5 mm, the wiring line resistance is about 0.1 $\Omega$ and the voltage drop caused thereby is hardly a problem. Here, an example in which the buried wiring lines are formed by a plating process is discussed, but the same discussion also applies to other variations of the present invention, such as the ones with metal fine wires. For example, in the case of metal fine wires, if the diameter is 1–10 $\mu$m, the resulting wiring line resistance is about 0.1 $\Omega$ and the same effect as that in the case of the plating process can be obtained.

Of course, the buried wiring structure can be employed for common wiring lines other than power supply lines, such as data lines, clock lines of shift registers, and the like, which lines have signal delays caused by wiring line resistance, and thereby similar advantageous effects in the case of the power supply line are achieved.

It is noted that the display devices according to Embodiments 1–2 are not limited to liquid crystal display devices, but are similarly applicable to a display device having a light emission type matrix panel, such as plasma discharge panels (PDP) and electro-luminescent (EL) displays.

BRIEF DESCRIPTION OF THE DRAWINGS

FIGS. 8(A) and 8(B) illustrate the principle of Embodiment 2, in which FIG. 8(A) shows a plan view of a liquid crystal display device according to Embodiment 2 and FIG. 8(B) shows a cross sectional view of the liquid crystal display device.

FIGS. 10(A) to 10(C) are cross-sectional views illustrating the major steps in the process of producing a liquid crystal display device of Example 2-1.

FIGS. 11(A) to 11(C) are cross-sectional views illustrating the major steps in the process of producing a liquid crystal display device of Example 2-2.

FIGS. 12(A) to 12(C) are cross-sectional views illustrating the major steps in the process of producing a liquid crystal display device of Example 2-3.

FIGS. 34(a) and 34(b) are graphs showing the characteristics of polycrystalline silicon thin film transistors and single crystal silicon transistors.

BEST MODE FOR CARRYING OUT THE INVENTION

Embodiment 1

In Embodiment 1, a resin substrate having a bus line is mounted in a peripheral portion of an active matrix substrate (hereafter also referred to as "an array substrate"), and the bus line is electrically connected to a driver circuit section via a via hole formed in the resin substrate. This construction makes it possible to form a low resistance bus line in the peripheral portion of the array substrate. In addition, a connecting terminal is provided at a part of the bus line, and thereby a reduction in the size and thickness of a flexible wiring board is achieved. Now, Embodiment 1 according to the present invention is specifically described below by means of Examples 1-1 to 1-5.

EXAMPLE 1-1

Figure 1:
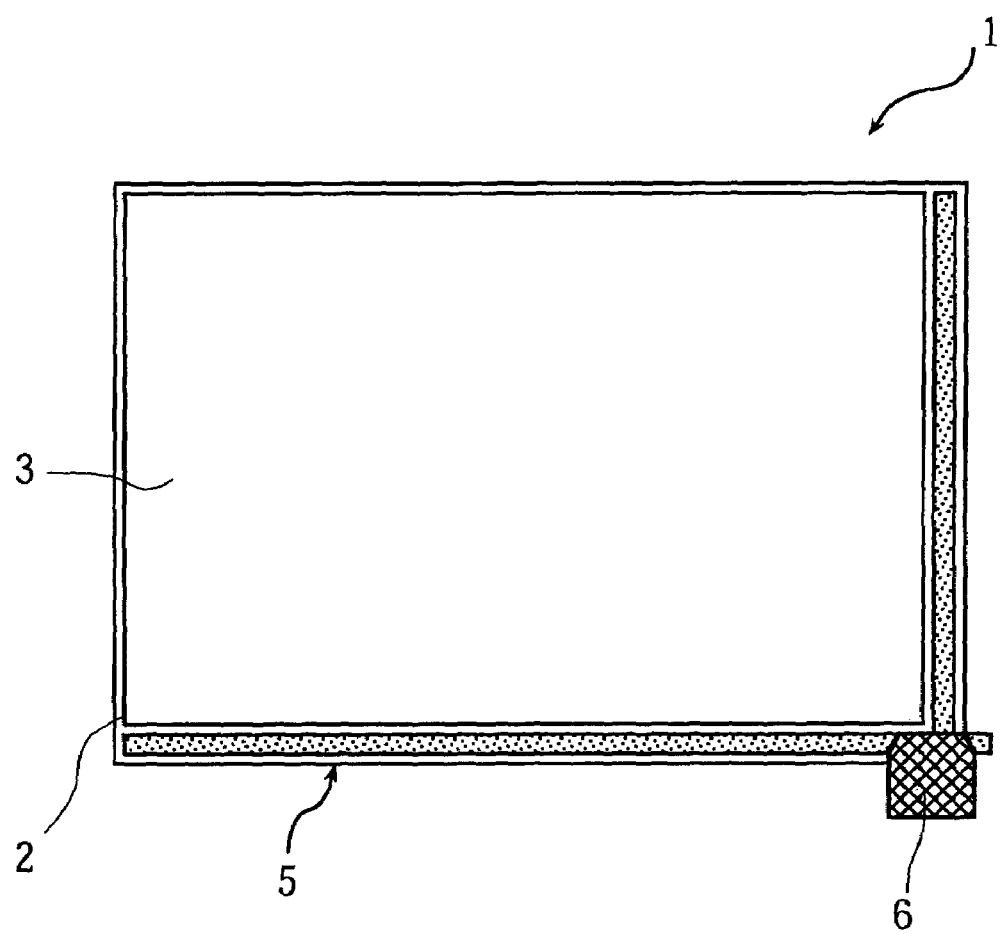
FIG. 1 is a plan view showing a display panel of Example 1-1.
Figure 2:
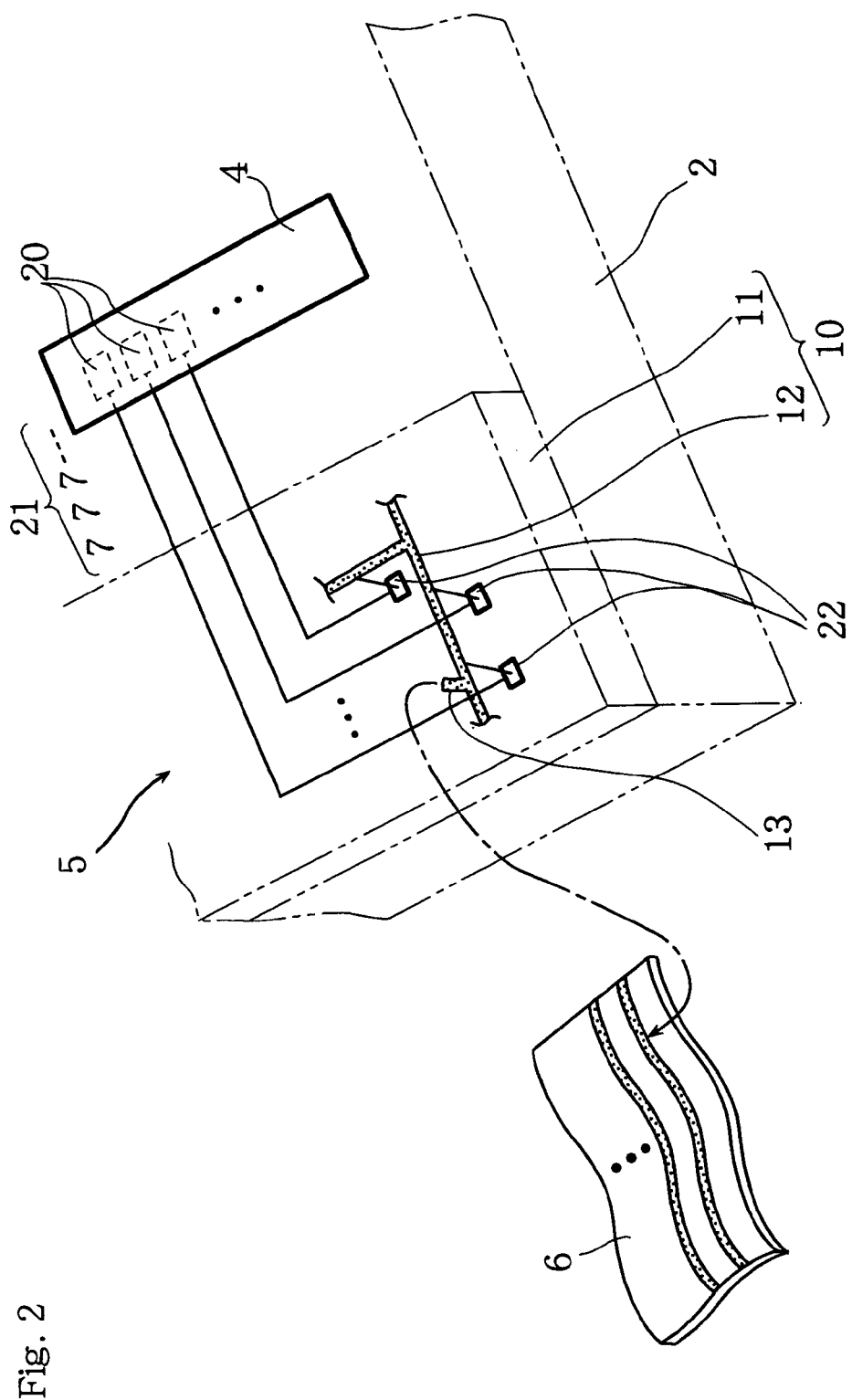
FIG. 2 is a schematic view showing the state of wiring in the peripheral portion of the display panel.
Figure 3:
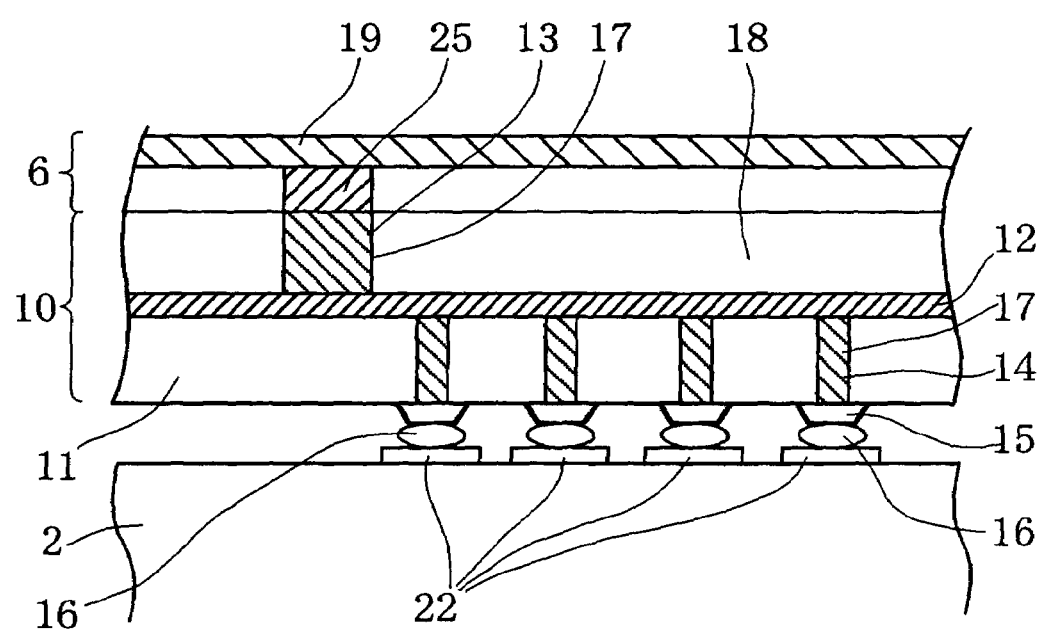
FIG. 3 is a cross-sectional view of a peripheral portion of the display panel.

FIG. 1 shows a plan view of a display panel made according to Example 1-1, FIG. 2 shows the state of the wiring in the vicinity of a peripheral portion of the display panel, and FIG. 3 shows a cross-sectional view of the vicinity of the peripheral portion of the display panel. A display panel 1 is an active matrix liquid crystal display panel and has an array substrate 2 and a counter substrate 3. Between the array substrate 2 and the counter substrate 3, a liquid crystal is filled. The array substrate 2 is a driver circuit-integrated type active matrix substrate in which a driver circuit section 4 (a scanning line driver circuit or a signal line driver circuit, see FIG. 2) is composed of polycrystalline silicon. That is, the driver circuit section 4 is an integrated driver circuit that is simultaneously constructed during the production process for the liquid crystal display unit.

The liquid crystal display unit comprises a plurality of scanning lines and a plurality of signal lines arranged in a matrix, and thin film transistors (TFT), serving as pixel switching elements, disposed at each intersectional position of the scanning lines and the signal lines. The driver circuit section 4 is formed in a peripheral portion of the liquid crystal display unit.

The driver circuit section 4 comprises a plurality of circuit elements 20 including an inverter and a latch, and to each of the circuit elements 20, electric power is independently supplied via an individually-wired line array 21 comprising a plurality of power supply lines 7. Each of electrode pads 22 of the individually-wired line array 21 is extended to the peripheral portion of the array substrate 2. It is to be noted that the individually-wired line array 21 is provided for a set of power supply lines 7 as well as for the data lines and clock signal lines, or various other control signal lines, and these lines are commonly connected to the corresponding bus lines 12 and are connected to an external circuit via a connecting terminal 13. For convenience in description, taking the power supply lines 7 as an example, further details are given below.

A notable feature here is that a multi-layer bus line-equipped section 5, which has a bus line to be commonly connected to the individually-wired line array 21, is formed in a peripheral portion of the array substrate 2, and that by the multi-layer bus line-equipped section 5, each of the electrode pads 22 of the individually-wired line array 21 is connected to the bus line 12 and is connected to a flexible wiring board 6 via the connecting terminal 13 of the bus line 12. This configuration achieves a low resistance in the bus line 12 and a size and thickness reduction in the flexible wiring board 6.

The specific configuration of the bus line-equipped section 5 is shown in FIGS. 2 and 3. The bus line-equipped section 5 is composed of a resin substrate 10, which has an extended shape (extended in a lateral direction of FIG. 1) and is mounted on the peripheral portion of the array substrate 2. The resin substrate 10 has an insulating layer 11 composed of, for example, aramid-epoxy resin, and on the upper surface of the insulating layer 11, the bus line 12 is formed. The bus line 12 is produced by patterning a copper foil formed on the upper surface of the insulating layer 11 in a prescribed pattern. The bus line 12 is protected by a protective layer 18.

In the insulating layer 11, via holes 17 are formed, and in each of the via holes 17, an electrically conductive member 14 mainly composed of an electrically conductive paste is filled. At the lower end of the electrically conductive member 14, a bump electrode 15 is formed, and the bump electrode 15 is bonded with each of electrode pads 22 by means of a conductive adhesive 16. This ensures the securing of the resin substrate 10 with the array substrate 2 and the electrical connection of the individually-wired line array 21 with the bus line 12. It is to be noted that the protective layer 18 also has a via hole 17 formed therein, and in this via hole 17, a conductive paste is filled, forming a connecting terminal 13 to an external circuit. The connecting terminal 13 is connected to a wiring line 19 of a flexible wiring board 6 via a conductive adhesive 25, and the flexible wiring board 6 is folded and guided to the back side of the array substrate and is connected to a printed circuit board having an external circuit formed thereon.

By employing such a configuration as described above, the bus line 12 is formed on the resin substrate 10 and therefore has a sufficient line width and a sufficient line thickness (film thickness). Accordingly, the bus line 12 has a low resistance.

In addition, the bus line 12 is taken out of the array substrate 2 from one point, via the connecting terminal 13, and therefore, the size and thickness of the flexible wiring board 6 to be connected to the connecting terminal 13 can be smaller than those of the prior art devices, thus achieving size and thickness reduction of the display device.

The protective layer 18 is not an essential element in the present invention, and therefore the protective layer 18 may be omitted.

EXAMPLE 1-2

Figure 4:
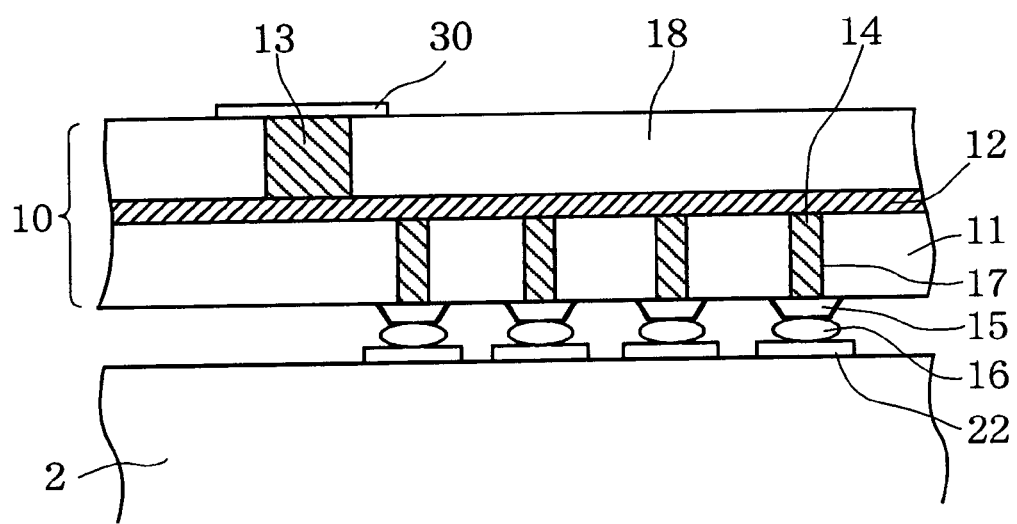
FIG. 4 is a cross-sectional view showing a display panel of Example 1-2.
Figure 5:
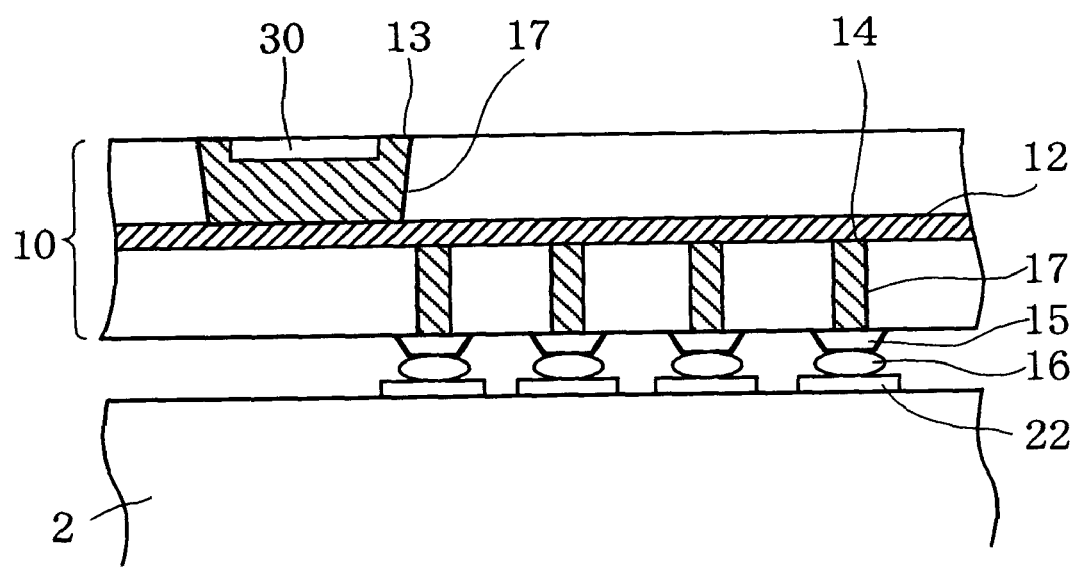
FIG. 5 is a cross-sectional view showing a display panel of Example 1-3.

FIG. 4 shows a cross-sectional view of a display panel according to Example 2. Example 1-2 is similar to Example 1-1 above, and like reference numerals refer to like parts. Example 1-2 is characterized in that, in place of using a printed circuit board on which the flexible wiring board 6 and the external circuit are mounted, the external circuit is directly mounted on the resin substrate. Specifically, a semiconductor chip 30 of a controller and the like is mounted on the resin substrate 10, and the semiconductor ship 30 is electrically connected to the connecting terminal 13. Such a configuration makes it possible to eliminate the printed circuit board on which the flexible wiring board 6 and the external circuit are mounted, thus remarkably reducing manufacturing cost.

EXAMPLE 1-3

The semiconductor chip 30 can be buried in the via hole 17. This achieves a further planar surface of the resin substrate 10 in comparison with that of Example 1-2.

EXAMPLE 1-4

Figure 6:
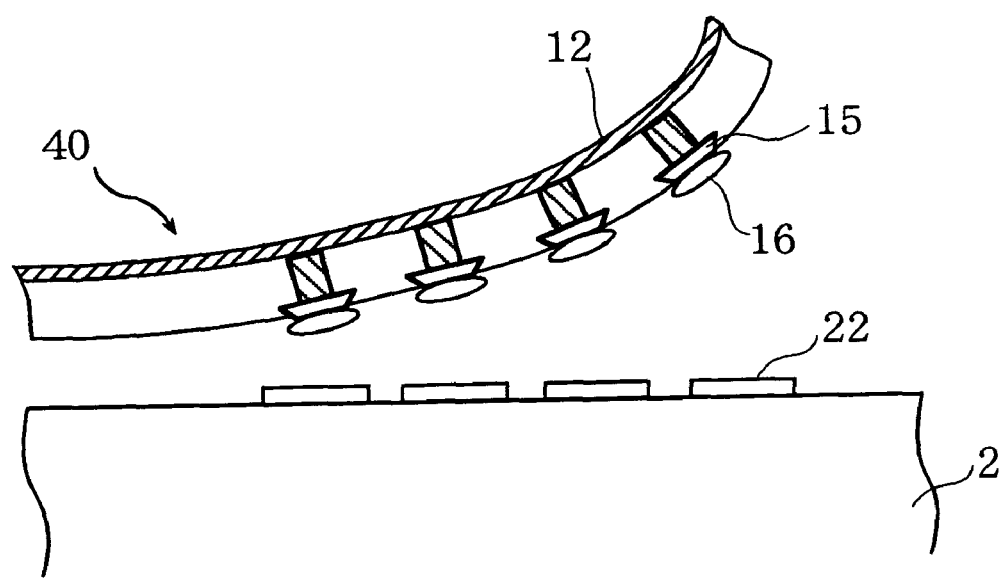
FIG. 6 is a cross-sectional view showing a display panel of Example 1-4.

FIG. 6 shows a cross-sectional view of a display panel of Example 1-4. Example 1-4 is similar to Example 1-1, and like reference numerals refer to like parts. Example 1-4 employs a film substrate 40 having flexibility in place of the resin substrate 10. The film substrate 40 is composed of, for example, a resin mainly composed of polyimide or epoxy. Consequently, bonding of the resin substrate 40 with the array substrate 2 can be carried out in such a manner that the film-like resin substrate 40 is gradually attached to the array substrate 2 from one end of the film-like resin substrate to another, which makes it easy to align the electrode pad 22 and the bump electrode 15.

In addition, the film substrate 40 may be composed of a thermoplastic material. In this case, the film substrate 40 itself has semi-adhesive property, and consequently, the film substrate 40 can be directly bonded to the array substrate 2, eliminating the bump electrode 15 and the conductive adhesive 16. When the film substrate 40 has semi-adhesive property, attachment and detachment of the substrate can be repeated again and again, which makes it easy to carry out an alignment process of the electrode pads 22 and the conductive members 14 in the via holes 17 and increases the precision of the alignment.

EXAMPLE 1-5

Figure 7:
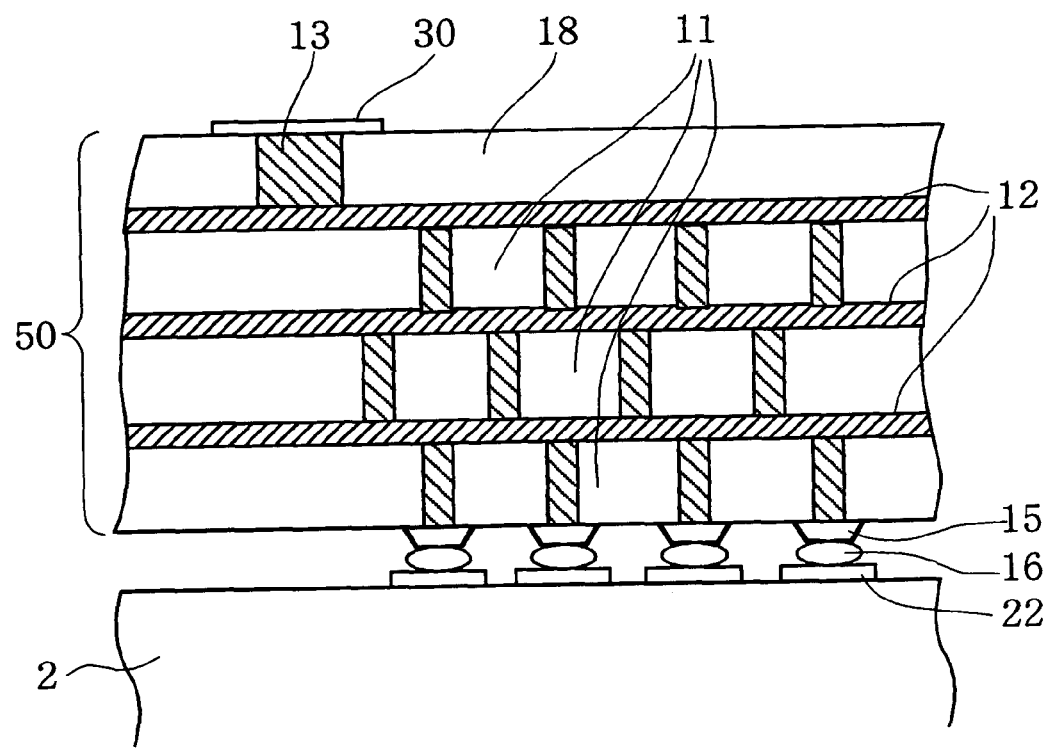
FIG. 7 is a cross-sectional view showing a display panel of Example 1-5.

FIG. 7 shows a cross-sectional view of a display panel of Example 1-5. In Example 1-5, in place of the single layer resin substrate 10, a multi-layer substrate 50 is employed. Specifically, as shown in FIG. 7, the multi-layer substrate 50 has a bus line 12 on the surface of the uppermost layer as well as on the surface of an inner layer, and the upper and lower bus lines are selectively connected via via holes 17 formed in each layer, forming a three-dimensional wiring line structure. This configuration allows more freedom in designing the bus line 12 and makes it possible to easily arrange a plurality of bus lines 12 depending on the types of signal lines. For example, when a plurality of types of individually-wired line arrays 21 are to be connected to a plurality of corresponding bus lines 12, there are instances where one of the bus lines 12 intersects another bus line 12. In such an instance, this example is particularly effective for easy formation of the bus lines.

SUPPLEMENTARY REMARKS FOR EXAMPLES 1-1 to 1-5

(1) In the foregoing examples, the conductive adhesive 16 may be an anisotropic conductive film or a silver paste.

The conductive adhesive 16 may be made of a material having thermoplastic property. In such a case, the resin substrate and the array substrate can be repeatedly bonded and detached many times, so that the alignment of the resin substrate and the array substrate is easily carried out. This is possible in the following manner: after an adhesive is semi-cured, an alignment compensation of the resin substrate and the active matrix substrate is carried out, and the adhesive is cured at, for example, 120–150° C. to secure the resin substrate and the active matrix substrate.

(2) Although the examples above employ bump electrodes 15, in place of the bump electrodes 15, the device of the invention may have a configuration such that a lower end of the conductive member 14 protrudes from the via hole and the protruding portion is directly connected to the electrode pad 22.

(3) The present embodiment describes a liquid crystal display device as an example, but the present invention is similarly applicable to a display device having a light emission type matrix panel, such as plasma discharge panels (PDP) and electro-luminescent (EL) displays.

Embodiment 2

In Embodiment 1, a resin substrate having a bus line is mounted on a peripheral portion of the array substrate. In Embodiment 2, the bus line is formed by printing. In Embodiment 2, the liquid crystal display device is an integrated driver circuit type liquid crystal display device in which the driver circuits are composed of a polycrystalline silicon semiconductor layer, as in Embodiment 1.

Figure 8:
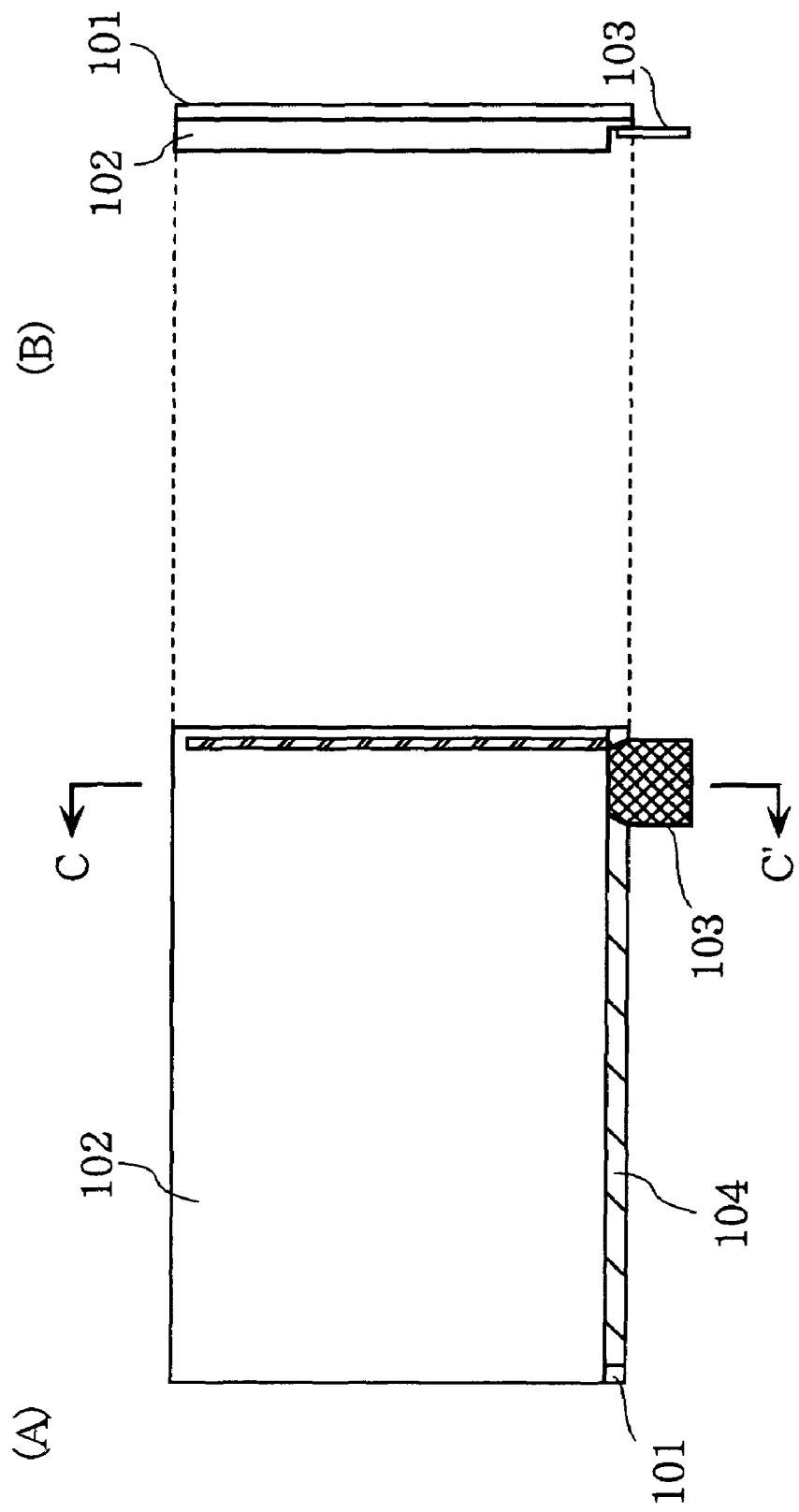
Figure 9:
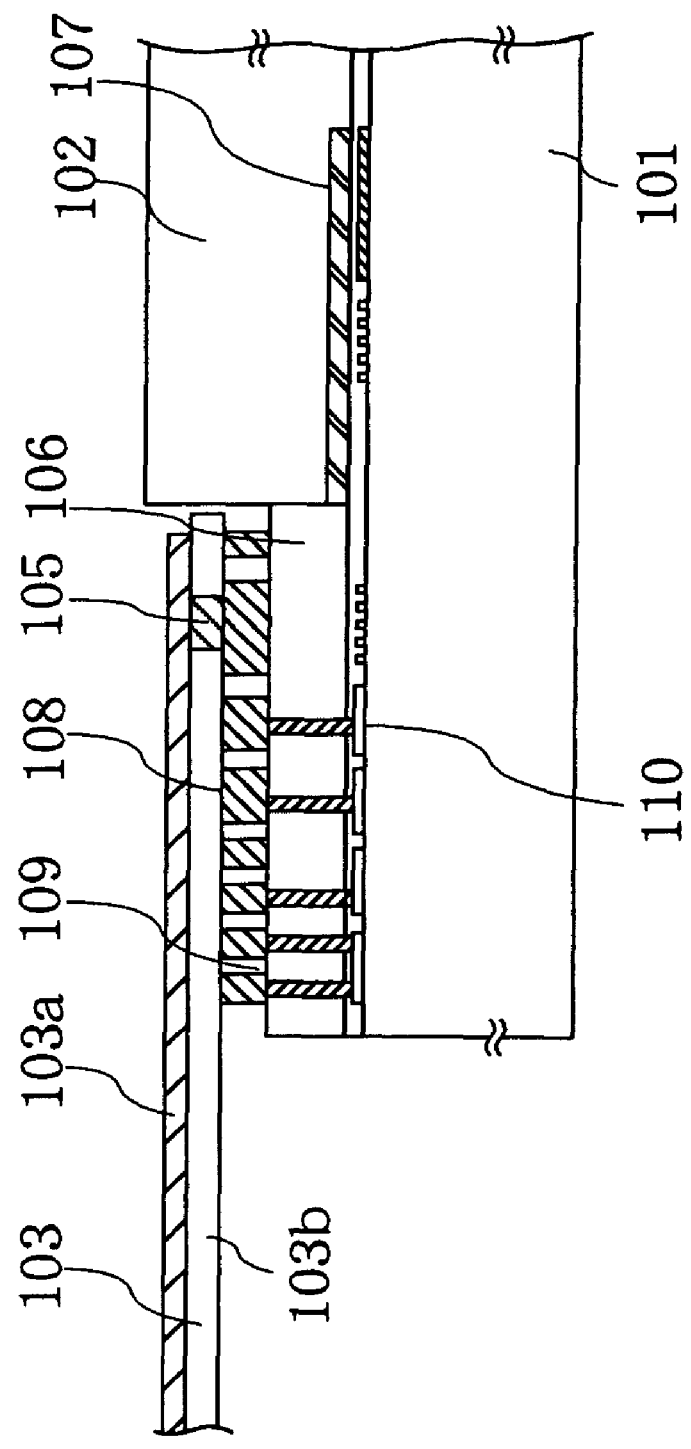
FIG. 9 is an enlarged cross-sectional view of FIG. 8(B).

First, referring to FIGS. 8(A) and 8(B) and FIG. 9, the principle of Embodiment 2 is discussed, and thereafter, various examples are detailed.

FIG. 8(A) shows a plan view of a liquid crystal display device of Embodiment 2, FIG. 8(B) shows a cross-sectional view of the liquid crystal display device of Embodiment 2, and FIG. 9 shows an enlarged cross-sectional view of FIG. 8(B).

FIGS. 8(A), 8(B), and 9 show an array substrate 101 on which thin film transistors are formed, a counter substrate 102, a flexible wiring board 103 for the connection with an external circuit, a multi-layer wiring line-equipped section 104 for a bus line, an anisotropic conduction resin 105 for connecting the flexible wiring board and the bus line, an interlayer insulating film 106, a sealant 107 for sealing the gap between the array substrate and the counter substrate, a bus line 108, a via hole 109, and a thin film wiring region 110 including thin film transistors provided on the array substrate.

One of the important features in the present embodiment is as follows. As shown in FIG. 9, the interlayer insulating film is formed on the thin film wiring region including thin film transistors provided on the array substrate, and thereafter the bus line is printed in only a required position/positions with the use of a conductive paste. Thereby, a multi-layer wiring connection is realized on the array substrate, and by remarkably reducing the size of the flexible wiring board and the printed circuit board, size reduction in the liquid crystal display device is achieved.

Now, specific configurations and producing methods are detailed by way of examples.

EXAMPLE 2-1

FIGS. 10(A) to 10(C) show cross-sectional views illustrating the major steps in the process of producing a liquid crystal display device of Example 2-1.

In FIGS. 10(A) to 10(C), reference number 121 designates a transparent insulating substrate, for which the present example employed a glass substrate available from Corning Inc. Reference number 122 designates an undercoat film, for which in the present example, an $SiO_2$ film having a thickness of about 400 nm was formed by plasma CVD. Reference number 123 designates a polysilicon film, for which the present example employed a polysilicon film produced by first forming an amorphous silicon film and subsequently fusing the film by an excimer laser. Reference number 124 designates a gate insulating film, for which, in the present example, an $SiO_2$ film having a thickness of about 90 nm was formed by plasma CVD. Reference number 125 designates a gate electrode, for which, in the present example, a Mo—W alloy film was formed by sputtering. Reference number 126 designates a pixel transistor, which includes the polysilicon film 123, the gate insulating film 124, and the gate electrode 125. It is noted that the device of FIGS. 10(A) to 10(C) includes p-type transistors and n-type transistors for the driver circuit, which are formed in a similar configuration.

Reference number 127 designates an interlayer insulating film, for which, in the present example, an $SiO_2$ film having a thickness of about 400 nm was formed by plasma CVD. Reference number 128 designates a protective film, for which, in the present example, an $SiN_x$ film having a thickness of about 500 nm was formed by plasma CVD. Reference number 129 designates a planarizing film, for which, in the present example, a photosensitive acrylic-based material having a thickness of about 3 μm was formed by coating. Reference number 130 designates a transparent conductive film, for which, in the present example, an alloy film of indium and tin having a thickness of about 75 nm was formed. Reference number 108 designates a bus line, for which the present example employed a bus line formed by screen printing using a silver paste DD-1662B-69 available from Kyoto Elex Co., Ltd. Reference number 132 designates a printed protective film for protecting the bus line 108, for which the present example employed a film formed by screen printing using an acrylic-based resin. Reference number 133 designates a source/drain electrode, for which, in the present example, a Ti/Al double layer film was formed by sputtering.

Now, an example of the producing method of the present embodiment is discussed below.

As shown in FIG. 10(A), an array substrate including a pixel portion is produced in a similar manner to a conventional method, except that, when a pattern of the protective film is formed, a via hole 109 is simultaneously formed by etching a wiring electrode portion (which corresponds to an electrode pad) in the thin film wiring region including the driver circuit section, for the connection with an external circuit.

Thereafter, as shown in FIG. 10(B), a bus line 108 is screen printed and cured at 180° C. for 30 minutes. Subsequently, as shown in FIG. 10(C), in order to protect the bus line 108, a printed protective film 132 is formed by screen printing.

Thus, a multi-layer wiring line-equipped section 104 for a bus line is formed on the array substrate.

The bus line formed in the present example had a sheet resistance of about 0.02 m $\Omega/\square$ and a printed width of 100

μm, and therefore achieved a sufficiently low resistance for a signal line and a power supply line. The present example uses the protective film 128, which has conventionally been used for an array substrate, as an interlayer insulating film in the multi-layer wiring line-equipped section 104, and therefore achieves simplification in the producing method since it is unnecessary to form an additional interlayer insulating film.

EXAMPLE 2-2

FIG. 11(A) to 11(C) show the major steps in the process of producing a liquid crystal display device of Example 2-2. In the present example too, a glass substrate available from Corning Inc. was employed as the glass substrate 121, and an $SiO_2$ film of about 400 nm was formed as the undercoat film by plasma CVD. The figures show a polysilicon film 123, a gate insulating film 124, and a gate electrode film 125, and these are comprised in a pixel transistor 126. In the driver circuit section, p-type and n-type transistors and a thin film wiring region comprising various wiring lines are provided. The figures also show an interlayer insulating film 127, a protective film 128, a transparent conductive film 130, a bus line 108, and a source or a drain electrode 133. These were produced in the same manner and in the same thicknesses as those in Example 2-1, and therefore, specific details are not further elaborated on here. Reference number 34 designates a printed interlayer insulating film, for which, in the present example, a polyimide-based resin was screen printed and cured at 300° C. for 20 minutes.

Now referring to each of the cross-sectional views, the producing method is discussed below.

As shown in FIG. 11(A), when the protective film 128 is patterned, the via hole 109 is simultaneously formed by an etching process, and thereafter, the transparent conductive film 30 is formed and patterned over a pixel region of the protective film 128 in a prescribed shape.

Next, as shown in FIG. 11(B), the printed interlayer insulating film 134 is formed over the thin film wiring line region including the driver circuit section by printing. The film thickness of the printed interlayer insulating film 134 was about 15 μm. In the printing, pattern aligning is required so that the via hole portion of the protective film 128 approximately matches the via hole portion to be formed by the printing. Subsequently, as shown in FIG. 11(C), the bus line is printed by screen printing, which completes the process.

In a liquid crystal display device thus produced, the bus line, in which a large current flows, and the driver circuit section, in which thin film transistors are present, are separated by forming a 15-μm thick polyimide having a low dielectric constant. Therefore, adverse effects caused by electromagnetic field were avoided, and the liquid crystal display device thus produced was suitable for high speed driving.

EXAMPLE 2-3

FIG. 12(A) to 12(C) show the major steps in the process of producing a liquid crystal display device of Example 2-3. In the present example too, the liquid crystal display device was produced by the same process, including that for thin film transistors, as that in Example 2-1 above. In the figures, there are shown a glass substrate 121, for which the present example employed a glass substrate available from Corning Inc., an undercoat film 122, a polysilicon film 123, a gate insulating film 124, and a gate electrode 125, and the polysilicon film 123, the gate insulating film 124 and the gate electrode 125 forms a pixel transistor 126. The figures also show an interlayer insulating film 127, a protective film 128, a planarizing film 129, a transparent conductive film 130, a bus line 108, a printed protective film 132, and a source or a drain electrode 133.

Now referring to the cross-sectional views, the producing method is discussed. As shown in FIG. 12(A), in the protective film 128, the pixel region including a position to be connected to the bus line 108 of the driver circuit section is subjected to a photolithography process and an etching process to form the via hole 109. Thereafter, the planarizing film 129 is formed to have a thickness of about 5 μm, and is subjected to photolithography and etching to form the via hole 109 in a like manner. In this process, of course, the pattern is formed so that the portion to be connected to the bus line 108 of the driver circuit section is opened. Subsequently, ITO (indium tin oxide), serving as the transparent conductive film 130, is formed by sputtering, and the contacts with the pixel portion and the driver circuit section are formed.

Next, as shown in FIG. 12(B), the bus line is printed by screen printing. Thereafter, as shown in FIG. 12(C), in order to protect the bus line 108, an acrylic-based resin is screen printed to form the printed protective film 132, which completes the producing of a liquid crystal display device.

In the present example, the planarizing film, which is formed for increasing an aperture ratio, is used as the interlayer insulating film for the bus line 108, and the transparent conductive film is used for the contacts with the connecting electrode of the driver circuit section. Therefore, the bus line need not to be in a direct contact with the connecting electrode of the driver circuit section, and the via holes can be made sufficiently small by a photolithography process, which makes it possible to achieve a further device size reduction and a reliable contact with the connecting electrode.

In the present embodiment, a liquid crystal display device having a top gate structure is taken as an example, but the embodiments of the present invention are not limited to those with a top gate structure, and of course, are similarly applicable to those with a bottom gate structure.

In addition, although a silver paste is given as an example of a material for the bus line, various conductive materials, such as copper, gold, and alloys thereof, may be used insofar as the material can be cured at about 400° C. or lower and has a sheet resistance of about 0.05 m $\Omega/\square$ or lower.

In addition, although screen printing is given as an example, the printing technique is not limited to screen printing, and various printing techniques may be employed, such as a writing technique, an intaglio printing technique, and an ink-jet printing technique.

In addition, materials for the printed interlayer insulating film are not limited to polyimide-based materials, and various materials may be used insofar as the materials can be cured at 400° C. or lower and be formed by printing or coating, such as an acrylic-based photosensitive resin and the like.

Additionally, in the present embodiment, a technique for producing a more reliable liquid crystal display device by forming a printed protective layer for protecting a bus line has been described, but it is noted that this is not an essential element in the present invention.

The present embodiment describes a liquid crystal display device as an example, but the present invention is similarly applicable to a display device having a light emission type matrix panel, such as plasma discharge panels (PDP) and electro-luminescent (EL) displays.

Embodiment 3

Embodiment 3 is characterized in that a bus line is buried in an active matrix substrate. Specific configurations of Embodiment 3 are detailed in the following Examples 3-1 to 3-6.

EXAMPLE 3-1

Figure 13:
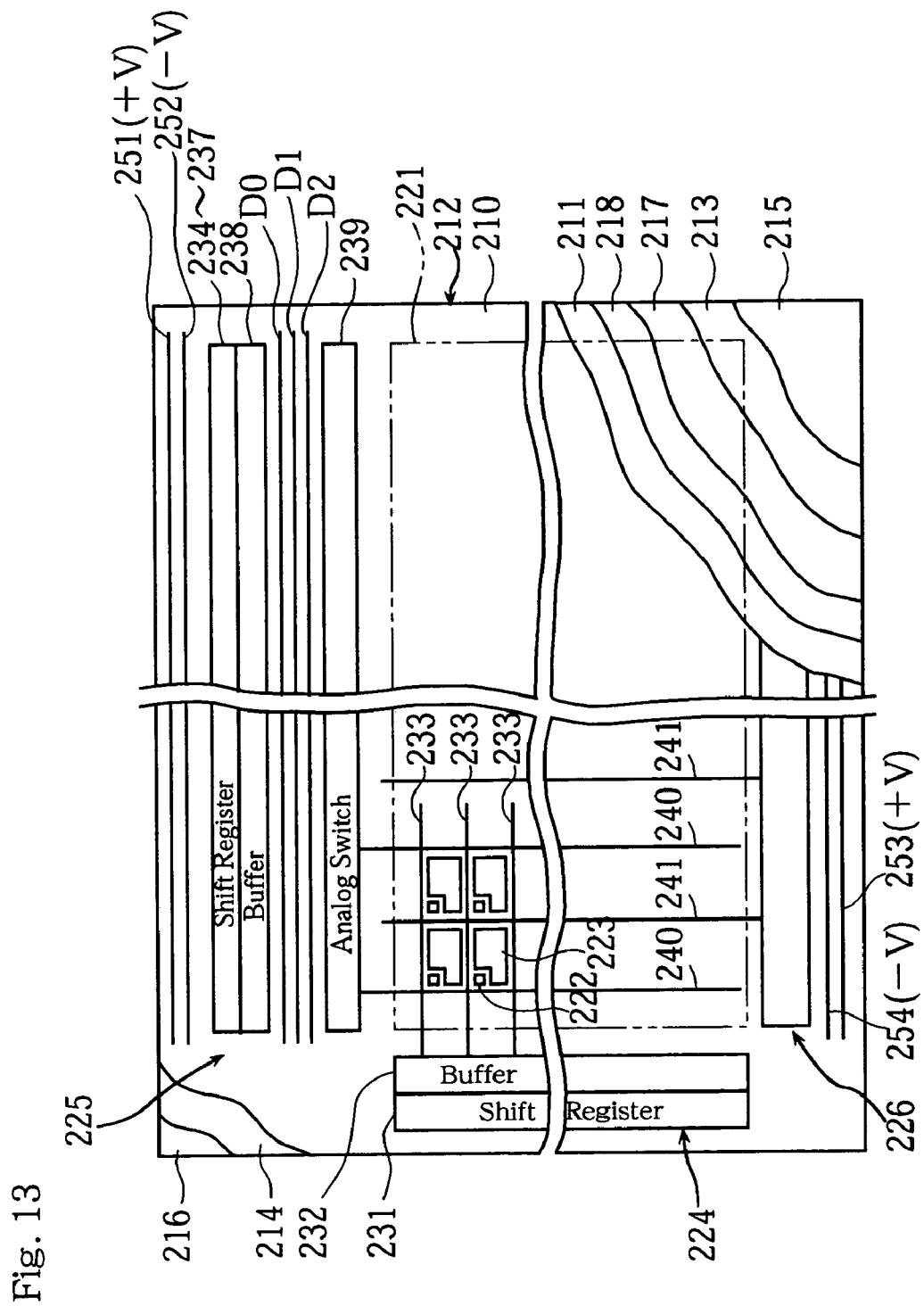
FIG. 13 is a plan view showing a liquid crystal display device of Example 3-1.
Figure 14:
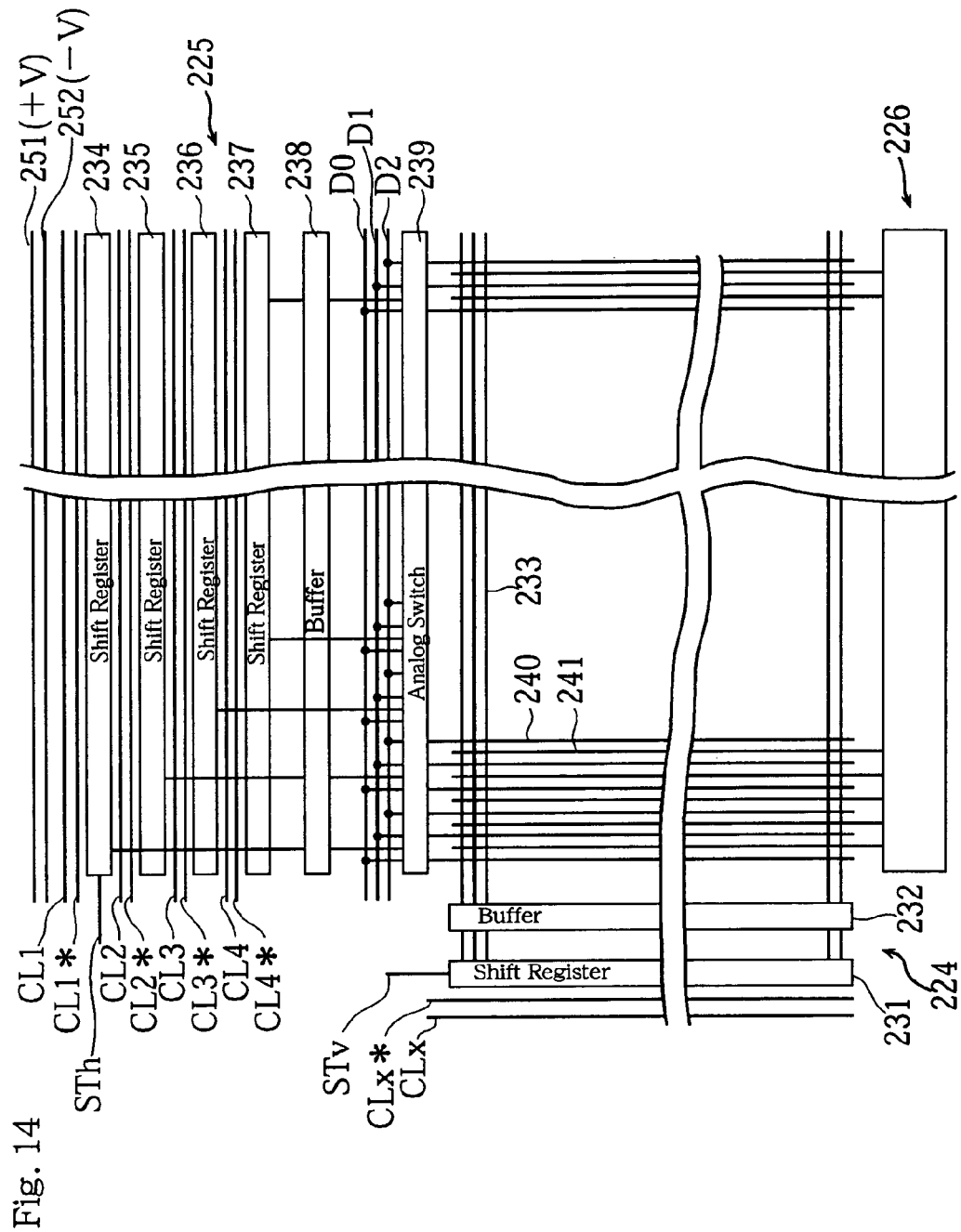
FIG. 14 is a circuit diagram of a liquid crystal display device of Example 3-1.

FIG. 13 shows a plan view of a liquid crystal display device of Example 3-1, and FIG. 14 shows a circuit diagram of the liquid crystal display device. The device discussed Example 3-1 is a 12.1-inch liquid crystal display device having 1024×768 pixels (so-called XGA mode) in which the pixel size is 57 µm square and analog image signals representing red, green, and blue are inputted for displaying color images. The liquid crystal display device of Example 3-1 is an integrated driver circuit type liquid crystal display device in which the driver circuit is composed of a polycrystalline silicon semiconductor layer.

As shown in FIG. 13, the liquid crystal display device has an active matrix substrate 212, a counter substrate 213, a liquid crystal layer 211 disposed between the substrates 212 and 213, polarizing plates 214 and 215 each disposed on one side of each of the substrates 212 and 213, and a back light 216 disposed outside the polarizing plate 214. The counter substrate 213 is a glass substrate. On the inner surface of the counter substrate 213, a micro color filter 217 and a counter electrode 218 are formed. The active matrix substrate 212 comprises, on a glass substrate 210, a liquid crystal display unit 221 having a matrix array composed of thin film transistors, and driver circuits 224–226 for driving the liquid crystal display unit 221, which are also formed on a glass substrate 210. More specifically, the liquid crystal display unit 221 of the active matrix substrate 212 comprises pixel switching thin film transistors (TFTs) 222 and pixel electrodes 223, each correspondingly provided for each pixel. The driver circuits 224–226 are provided on a peripheral portion of the liquid crystal display unit 221.

The driver circuit 224 comprises, as shown in FIG. 14, a shift register 231 and a buffer 232, and is connected to the gate electrode of each TFT 222 via a scanning signal line (gate line) 233. The driver circuit 224 sequentially outputs a scanning signal pulse to each scanning signal line 33 in response to a clock signal CLx, a inverted clock signal CLx*, and a start pulse (vertical synchronizing signal) STv.

The driver circuit 25 comprises four sets of shift registers 234–237, a buffer 238, and an analog switch (transfer gate) 239, and applies an image signal voltage to each of odd-numbered pixel electrodes 223 with respect to the horizontal direction in the display panel, via an image signal line 240 (source line) and the pixel switching TFT 222. The driver circuit 226 has a similar configuration to that of the driver circuit 225, and applies an image signal voltage to each of even-numbered pixel electrodes 223 via an image signal line 241. Since the driver circuit 226 has a similar configuration to that of the driver circuit 225 and operates in a similar manner, the driver circuit 225 is chiefly explained in the following discussion and the driver circuit 226 is not further detailed here.

Figure 15:
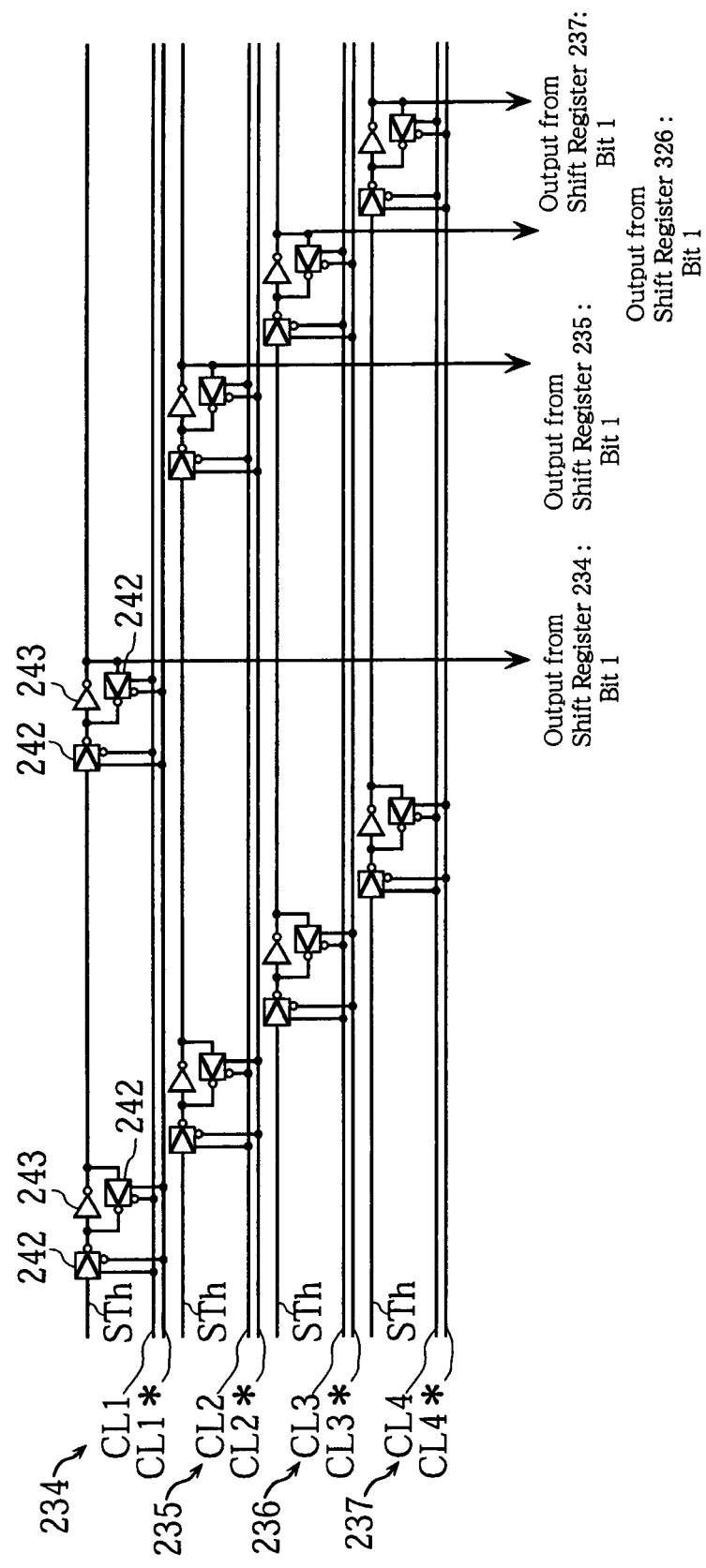
FIG. 15 is a circuit diagram showing the configurations of shift registers 234 to 237 shown in FIG. 14.
Figure 16:
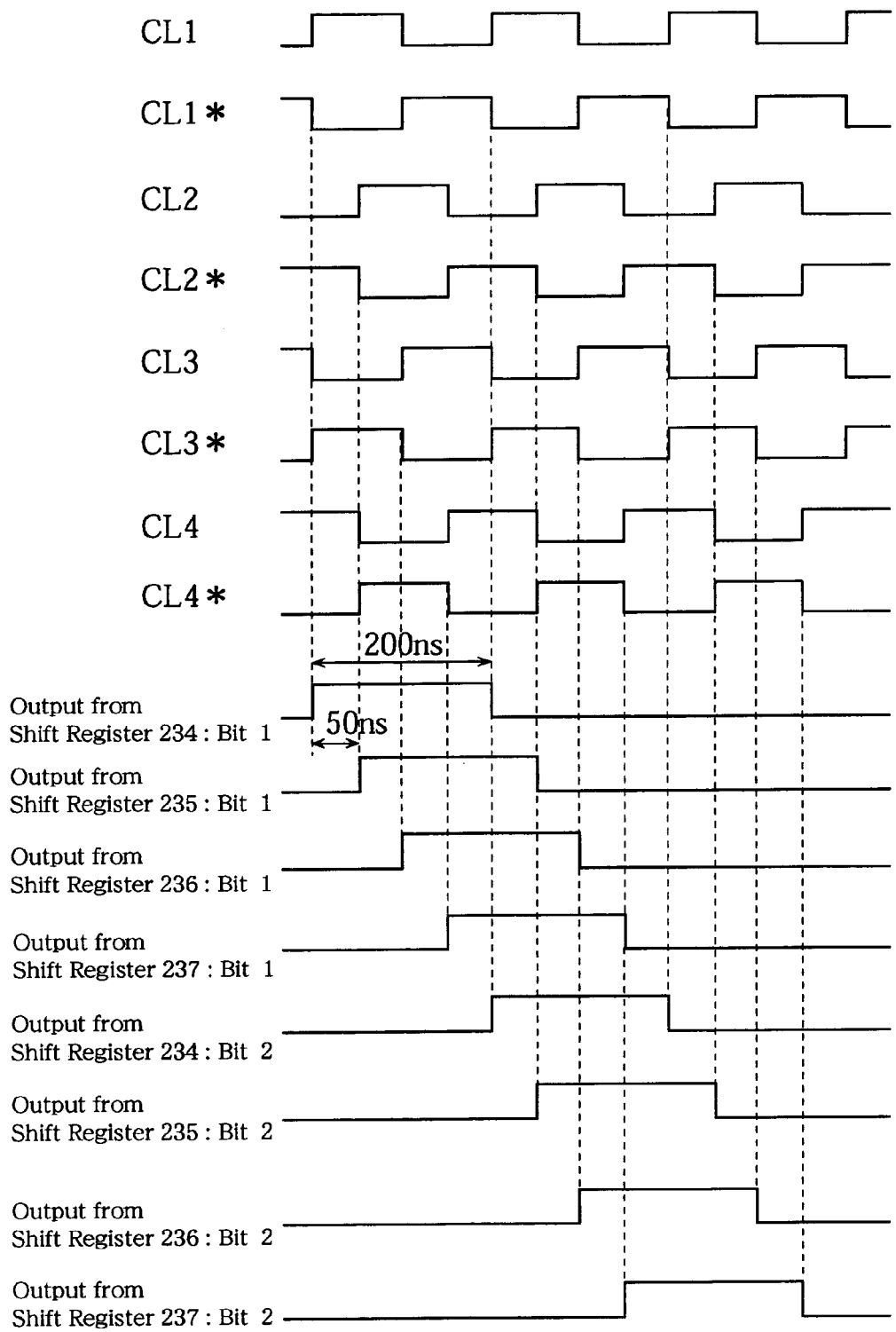
FIG. 16 is a timing chart showing the operation of shift registers 234 to 237.
Figure 17:
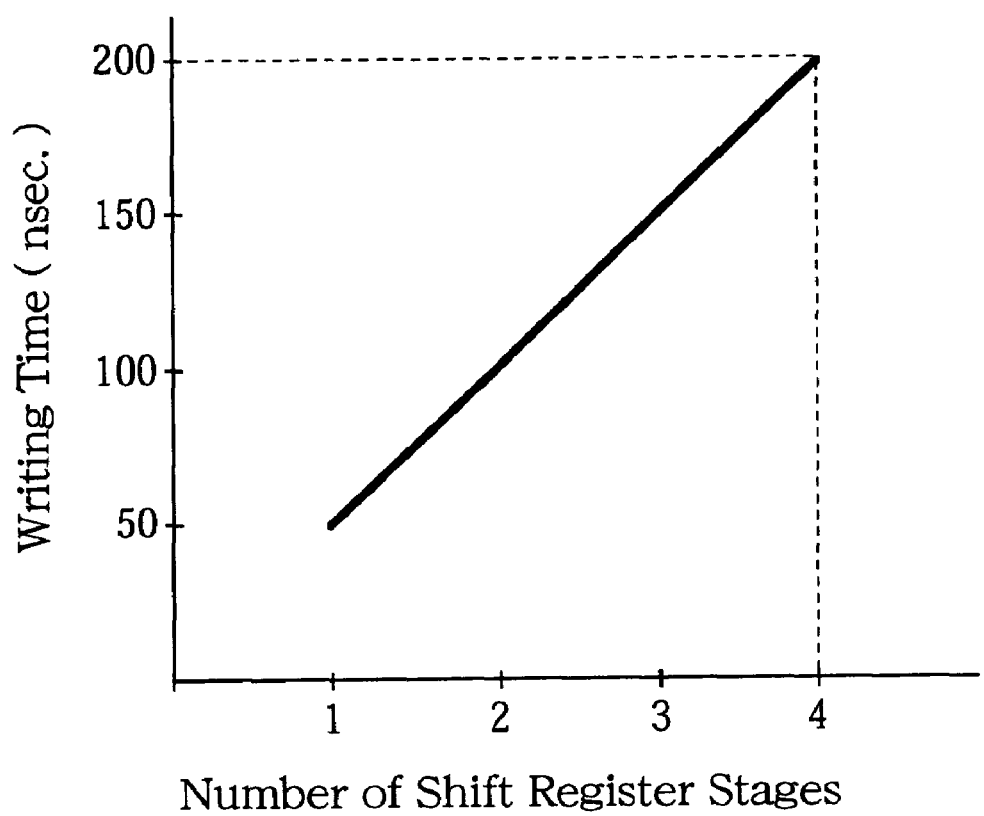
FIG. 17 is a graph showing the relationship between the number of the stages of shift registers and the writing time of image signal voltage.

Each of the shift registers 234–237 in the driver circuit 225 is composed of, as shown in FIG. 15, a plurality of passgates (three-state buffers) 242 and inverters 243. The shift registers 234–237 sequentially output, as shown in FIG. 16, pulse signals each having a pulse width of 200 ns and being phase shifted by 50 ns (each overlapped by 150 ns) in response to clock signals CL1–CL4, inverted clock signals CL1*–CL4*, and start pulses (horizontal synchronizing signals) STh.

The analog switch 239 outputs image signal voltages received from analog image signal lines D0–D2 to image signal lines 240 in response to the pulse signals received from the shift registers 234–237. From the shift registers 234–237, the pulse signals each overlapped by 150 ns are outputted as mentioned above, and in the overlapped period, an identical image signal is outputted from the analog switch 239 to each set of four image signal lines 240. Thus, each gap between the pixel electrodes and the counter electrodes 218 is first precharged during the period of 150 ns, and thereafter, in each gap, an electric charge corresponding to an image signal to be outputted is stored during the remaining period of 50 ns. This means that because the driver circuit has four stages of shift registers, a writing time of 200 ns can be practically obtained at substantially the same speed (a constant frame period) as that in the case where the dot clock is 50 ns. Therefore, reliable writing of image signals is ensured even when the number of pixels is large.

In addition, a +V power supply line 251 and a −V power supply line 252, which are bus lines for supplying power supply voltage to the driver circuit 225, are buried in the glass substrate 210. It is noted that a +V power supply line 253 and a −V power supply line 254, which are bus lines for the driver circuit 226, are also buried in the glass substrate 210. In the following discussion, the term "power supply line" does not mean an individually-wired line array for supplying power to each circuit element, but means a bus line commonly connected to the individually-wired line array.

In the present example, the power supply line for the driver circuit 224 does not have a buried wiring structure because voltage drop in the driver circuit 224 does not cause as serious a problem as that in the driver circuits 225 and 226. However, it is of course preferable that the power supply line for the driver circuit 224 also have a buried wiring structure.

That power supply lines have a buried wiring structure is the primary feature of the present embodiment. Now referring to FIGS. 18–21, the buried wiring structure is detailed below.

Figure 18:
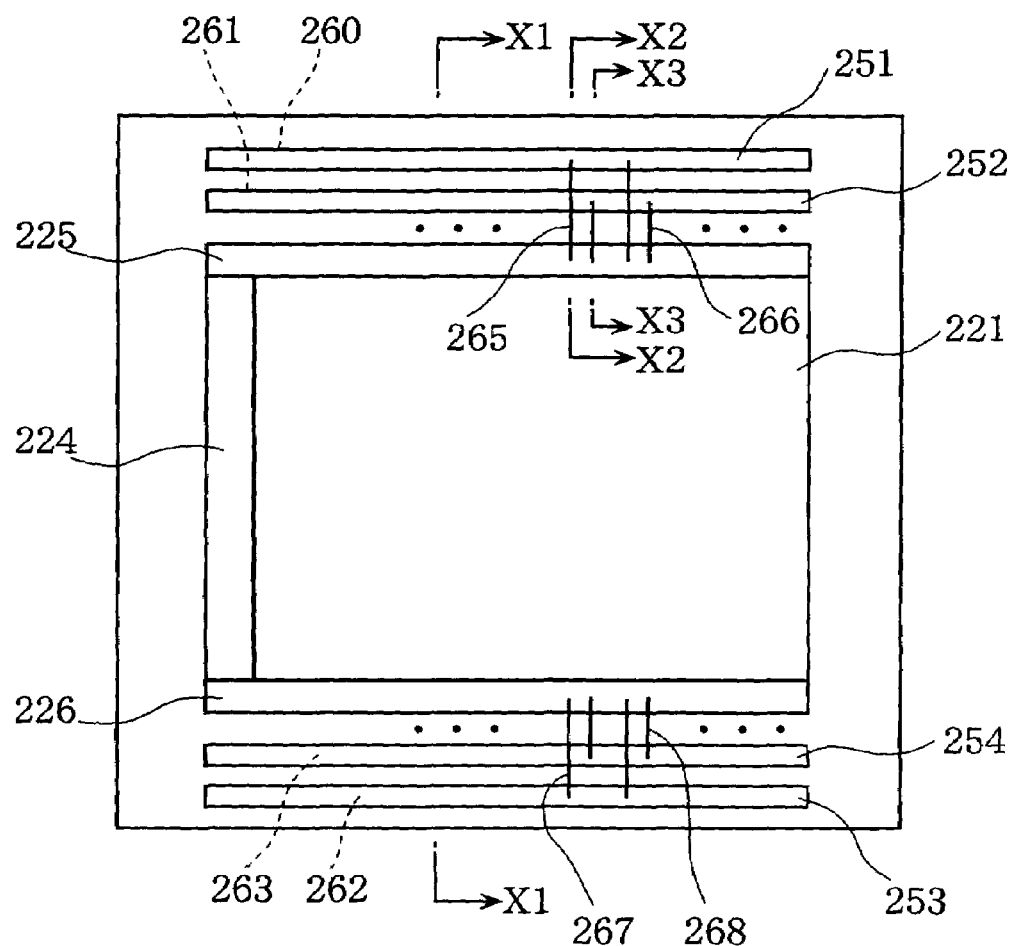
FIG. 18 is a schematic plan view of an array substrate 212.
Figure 19:
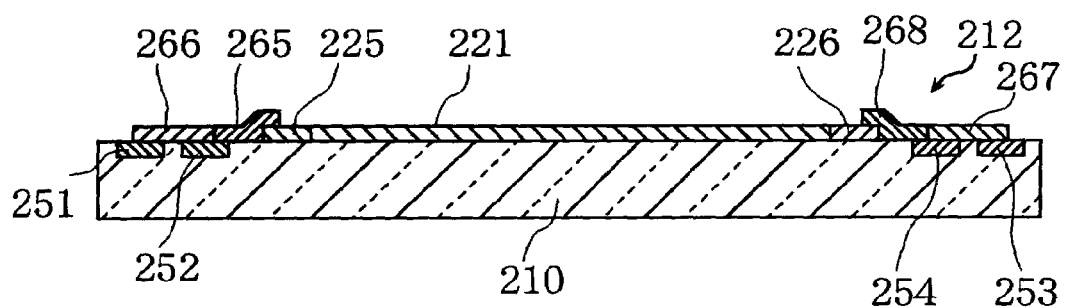
FIG. 19 is a cross-sectional view taken along the line X1—X1 in FIG. 18.
Figure 20:
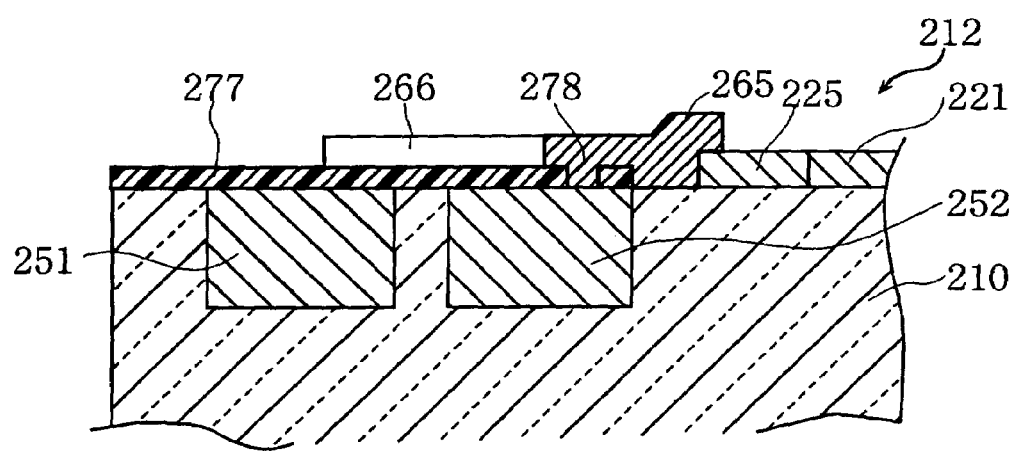
FIG. 20 is a cross-sectional view taken along the line X2—X2 in FIG. 18.
Figure 21:
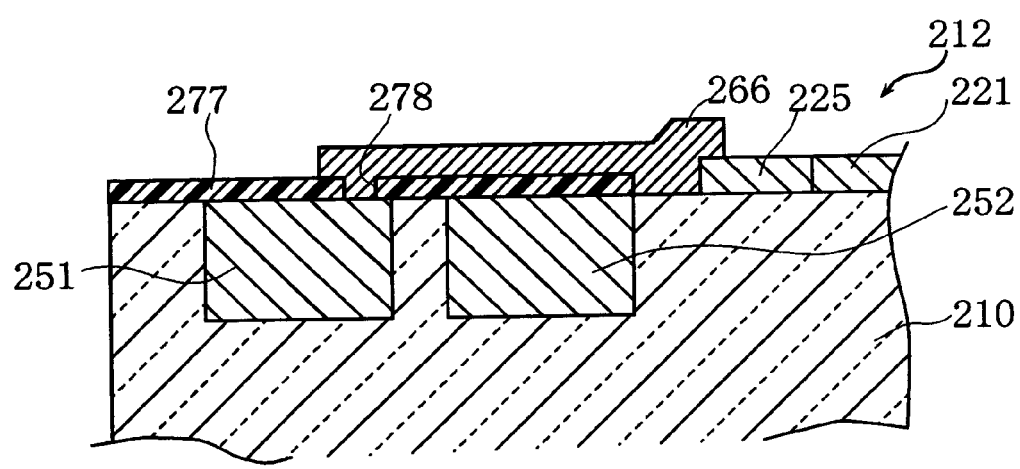
FIG. 21 is a cross-sectional view taken along the line X3—X3 in FIG. 18.

FIG. 18 shows a schematic plan view of the active matrix substrate 212, FIG. 19 shows a cross-sectional view taken along the line X1—X1 in FIG. 18, FIG. 20 shows a cross-sectional view taken along the line X2—X2 in FIG. 18, and FIG. 21 shows a cross-sectional view taken along the line X3—X3 in FIG. 18.

The glass substrate 210 has recessed grooves 260, 261 and 262, 262 in opposing peripheral portions thereof, respectively. The recessed grooves 260 and 261 are linearly extended near the driver circuit 225, and the recessed grooves 262 and 263 are linearly extended near the driver circuit 226. In the recessed groove 260, a metal wiring line serving as the +V power supply line 251 is buried, and in the recessed groove 261, a metal wiring line serving as the −V power supply line 252 is buried. In the recessed groove 262, a metal wiring line serving as the +V power supply line 253 is buried, and in the recessed groove 263, a metal wiring line serving as the −V power supply line 254 is buried. The +V power supply line 251 is connected to the driver circuit 225 (to be precise, connected to power supply electrode pads of the driving circuit 225) via connecting electrodes 266, and the −V power supply line 252 is connected to the driver circuit 225 (to be precise, connected to power supply electrode pads of the driving circuit 225) via connecting electrodes 265, so that electric power is supplied to the driver circuit 225. In a like manner, the +V power supply line 253 is connected to the driver circuit 226 (to be precise, connected to power supply electrode pads of the driving circuit 226) via connecting electrodes 267, and the −V power supply line 254 is connected to the driver circuit 226 (to be precise, connected to power supply electrode pads of the driving circuit 226) via connecting electrodes 268, so that electric power is supplied to the driver circuit 226. On the surfaces of the metal wiring lines, an insulating layer 277 (see FIGS. 20 and 21) is formed to prevent contact between the connecting electrode 266 and the power supply line 252. Although not shown in the figures, such an insulating layer 277 is also provided for the power supply lines 253 and 254 to prevent contact between the connecting electrode 67 and the power supply line 254.

Figure 22:
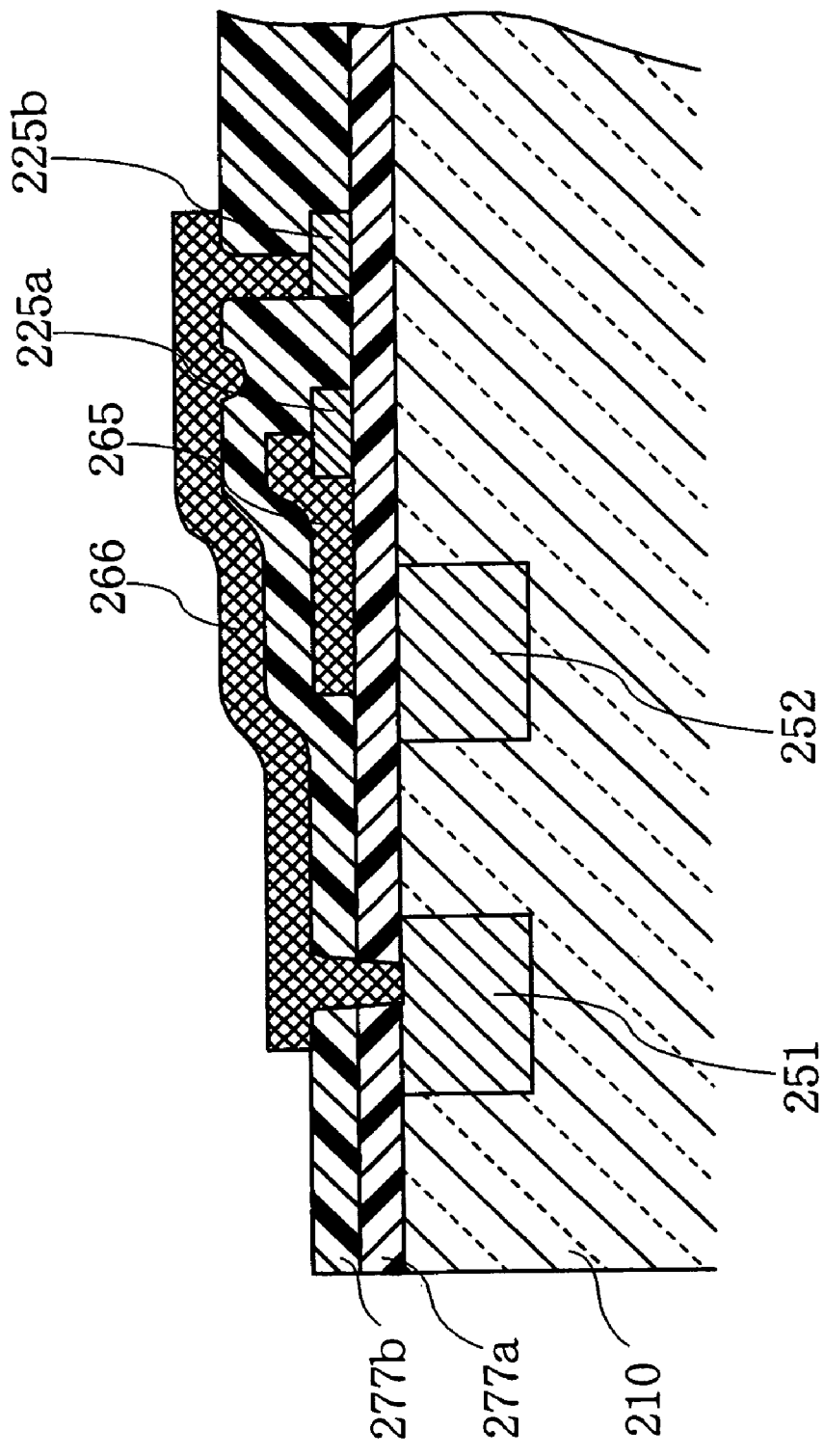
FIG. 22 shows a variation of the connecting configuration between metal wiring lines and a driver circuit section.

It is also possible that the power supply lines 251 and 252 are connected to power supply electrode pads 225*b* and 225*a* via the connecting electrodes 266 and 265, respectively, in such a manner, as shown in FIG. 22, that the connecting electrodes 266 and 265 are extended from the same positions of the power supply lines 251 and 252.

As has described above, the power supply lines have a buried wiring structure, and this achieves the following advantageous effects.

(1) If the film thickness of the metal wiring line layer is increased by increasing the depth of the recessed groove, the wiring line resistance of the power supply lines is easily made about 0.1 ohms. Consequently, even if a shoot-through current of about 160 mA flows in the shift registers 234–237 and so forth, voltage drop of power supply voltage is minimized to ensure reliable operation of the driver circuit 225. For reference, in such cases that the resistance value is reduced by forming power supply lines in thin film form, it is necessary that the peripheral region of the substrate have a large area, and therefore, a liquid crystal display device having a narrow frame cannot be achieved by such a technique. In this regard, the present embodiment can reduce the resistance value of power supply lines without increasing the area of the peripheral region, and therefore makes it possible to produce a liquid crystal display device having a narrow frame.

(2) Even if the film thickness of the metal wiring lines is increased, power supply lines do not protrude from the surface of the substrate because the metal wiring line layer is buried in the substrate. Accordingly, the wiring lines for connecting the metal wiring line layer to the driver circuit and the insulating layer formed thereover do not have differences in the surface levels, and the surface of the active matrix substrate is planarized. Consequently, uniformity of the cell gap can be maintained, and degradation of display characteristics does not occur. For reference, in order to merely reduce the resistance value of the power supply lines, it is only necessary to form a metal wiring line layer having a large film thickness on the substrate. However, in such a case, the metal wiring line layer greatly protrudes from the substrate surface, and this results in differences in the surface levels of the wiring lines connecting the metal wiring line layer and the driver circuit and of the insulating layer formed thereover. This causes the following problem; when the substrates are attached and pressed from both sides thereof to make the cell gap to be a constant value, a bend occurs in the substrates and a uniform cell gap cannot be maintained over the substrate plane. In this regard, since the present embodiment employs a buried structure for the metal wiring line layer, planarization of the substrate surface is achieved, and uniformity in the cell cap is maintained.

The film thickness of the metal wiring layer may be determined taking into consideration the power supply voltages and the size of the liquid crystal display panel.

Now, a producing method of the buried electrode structure is described below.

Figure 23:
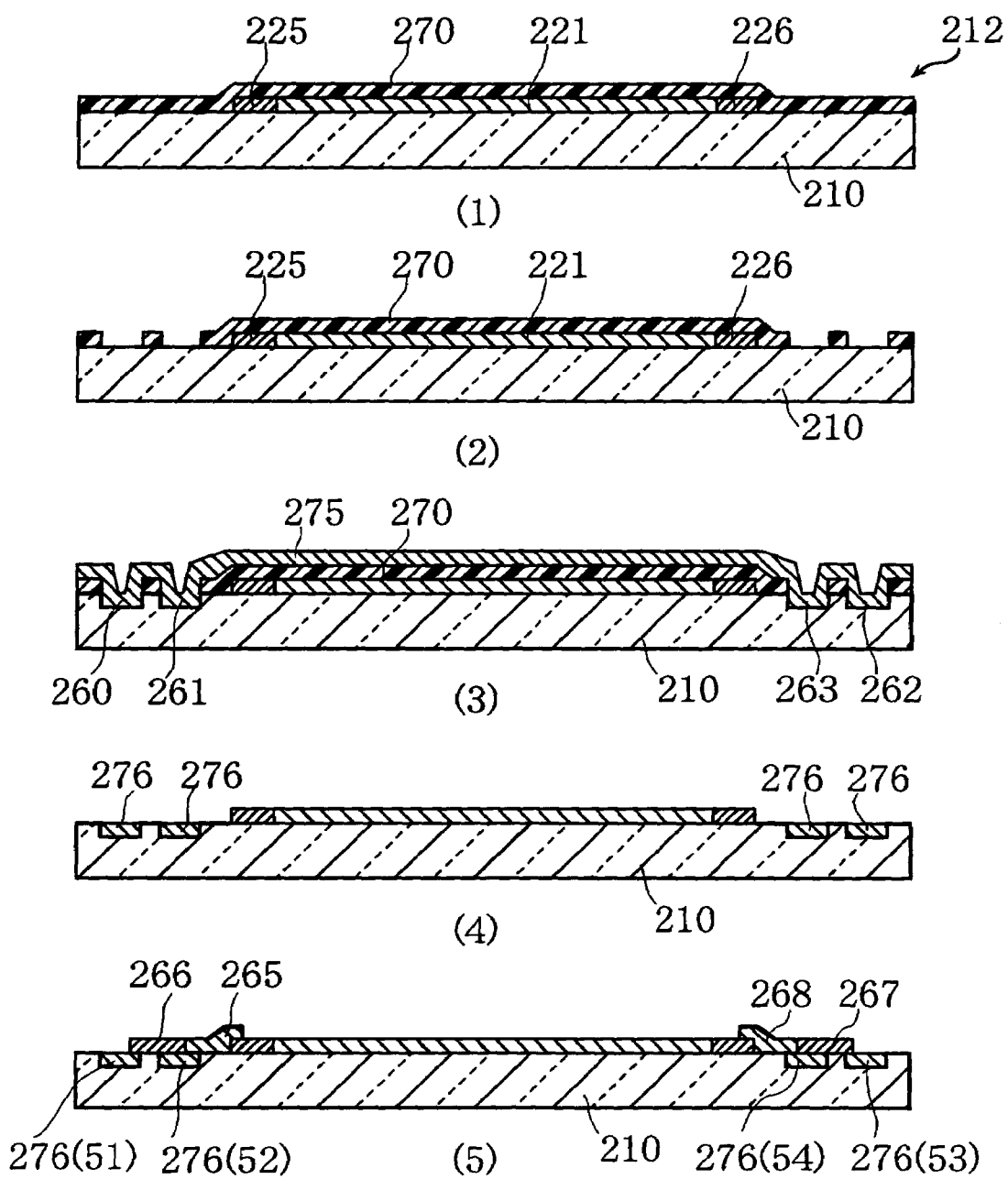
FIGS. 23(1) to 23(5) show a production process of an array substrate of Example 3-1.

(1) First, as shown in FIG. 23(1), a resist 270 is applied over the entire surface of the glass substrate 210, on which the driver circuits 224–226 and the liquid crystal display unit 221 are formed.

(2) Next, as shown in FIG. 23(2), portions of the resist 270 where recesses are to be formed in the glass substrate 210 are removed.

(3) Next, as shown in FIG. 23(3), using an aqueous solution containing 2% hydrofluoric acid and 8% glycerin, etching is carried out for about 2 minutes to form a recess having a depth of about 1500 nm. Subsequently, a metal film 75 composed of Al is formed by sputtering so as to have a thickness of 1500 nm.

(4) Next, as shown in FIG. 23(4), the resist 270 is removed. Thereby, metal wiring lines 276, corresponding to power supply lines 251–254, are formed in such a state that the wiring lines are buried in the recessed grooves 260–263.

(5) Next, by a photolithography method, the insulating film 277 and contact holes 278 are formed as shown in FIGS. 20 and 21, and the connecting electrodes 265–268 for connecting the buried metal wiring lines and the driver circuit are formed. Thus, an active matrix substrate 212 in which power supply lines 251–254 are buried is produced.

It is noted that metal materials to be buried may be various materials such as Ni, Cr, Mo, and Ta, other than Al.

EXAMPLE 3-2

A producing process of Example 3-2 is discussed. The basic circuit configuration and the process of making TFTs on a glass substrate are identical to those in Example 3-1, except the following. In Example 3-1, the recessed grooves are formed by chemical etching, but in Example 3-2, the recessed grooves are formed by sandblasting. Now, referring to FIGS. 24(1) to 24(6), details are given below.

Figure 24:
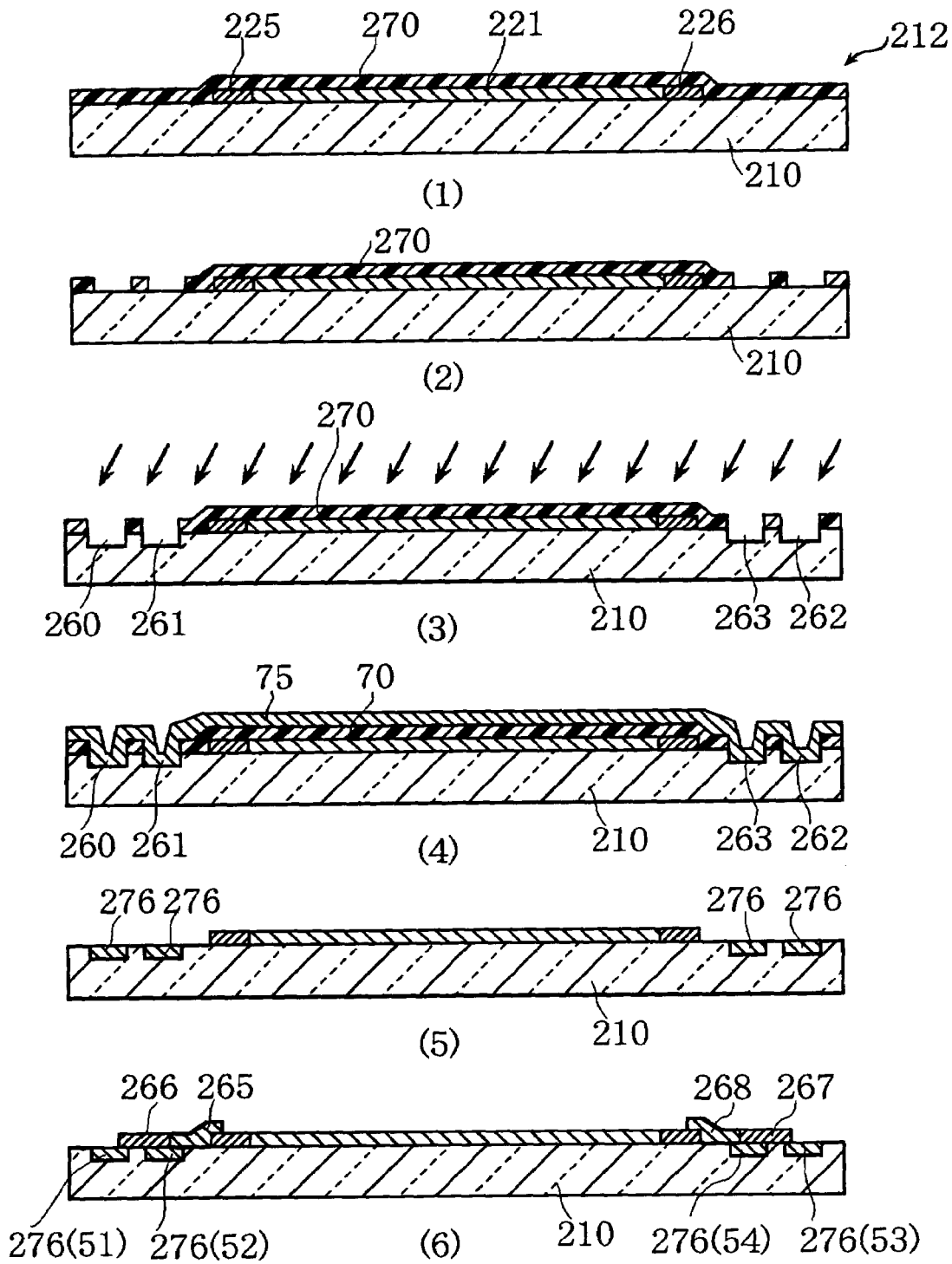
FIGS. 24(1) to 24(6) show a production process of an array substrate of Example 3-2.

(1) First, as shown in FIG. 24(1), a resist 270 is applied over the entire surface of the glass substrate 210, on which the driver circuits 224–226 and the liquid crystal display unit 21 are formed.

(2) Next, as shown in FIG. 24(2), portions of the resist 270 where recesses are to be formed in the glass substrate 210 are removed.

(3) Next, as shown in FIG. 24(3), using the resist 270 as a mask, etching by sandblasting is carried out for about 2 minutes. Thereby, the portions in the glass substrate which are not covered by the resist pattern are caved in by blasted hard particles, and recesses having a depth of about 1500 nm (corresponding to recessed grooves 260–263) are formed.

(4) Next, as shown in FIG. 24(4), a metal film 275 composed of Al is formed by sputtering, so as to have a thickness of 1500 nm.

(5) Next, as shown in FIG. 24(5), the resist 270 is removed. Thus, metal wiring lines 276 corresponding to the power supply lines 251–254 are formed in such a state that the metal wiring lines 276 are buried in the recessed grooves 260–263.

(6) Next, by a photolithography method, the insulating film 277 and contact holes 278 are formed as shown in FIGS. 20 and 21, and the connecting electrodes 265–268 for connecting the buried metal wiring lines and the driver circuit are formed. Thus, an active matrix substrate 212 in which power supply lines 251–254 are buried is produced.

Example 3-2 has such an advantage that, since the recessed grooves are formed by sandblasting, the etching rate is 10 or more times higher than that of Example 3-1, in which the recessed grooves are formed by using an etchant solution, which indicates that the processing speed is high. In terms of the precision of the processing, Example 3-1 is superior to Example 3-2. Accordingly, the chemical etching method of Example 3-1 exhibits a high controllability of the depth of the recessed groove, and it is possible to control the depth to a desirable depth. Therefore, it is desirable that when a reduction in the time required for the producing process is considered more important, a physical etching method as Example 3-2 is employed, whereas when a precision in the depth of the recessed grooves is considered more important, a chemical etching method as Example 3-1 is employed.

EXAMPLE 3-3

Figure 25:
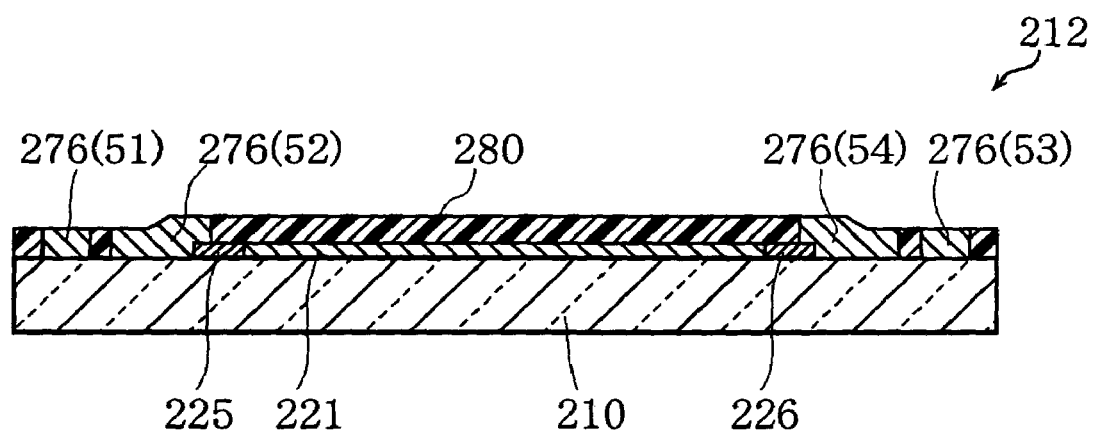
FIG. 25 is a schematic cross-sectional view of an array substrate of Example 3-3.

FIGS. 25 shows a schematic cross sectional view of an active matrix substrate of Example 3-3. The foregoing Examples 3-1 and 3-2 depict a technique in which the glass substrate is directly processed by etching or sandblasting. By contrast, in Example 3-3, the glass substrate 210 is not processed, but instead, a resin 280 is applied onto the substrate surface and metal wiring lines 276 are buried in the resin 280. It is noted that, between the driver circuit 225 and the metal wiring lines 276, which correspond to the power supply line 252, an insulating layer (not shown in FIG. 25) is provided, and via the connecting electrode 265 (not shown in FIG. 25) passing through a contact hole formed in the insulating layer, the power supply line 252 is connected to the driver circuit 225. On the surfaces of the metal wiring lines 276, 276, which correspond to the power supply lines 252 and 251, an insulating layer (not shown in FIG. 25) is formed, and via the connecting electrode 266 (not shown in FIG. 25) passing through a contact hole formed in the insulating layer, the power supply line 251 is connected to the driver circuit 225. These configurations for the power supply lines 252 and 251 are also provided for the power supply lines 253 and 254. As a consequence, contact between the connecting electrode 266 and the power supply line 252 is prevented, and likewise, contact between the connecting electrode 267 and the power supply line 254 is prevented.

This configuration of a buried wiring structure can also reduce the resistance values of the power supply lines 251–254, and in addition, because the resin layer 280 serves as a planarizing layer, a uniform cell gap can be maintained. It is noted that Examples 3-4 to 3-6, as well as the present Example 3-3, have a structure such that a resin layer is formed on a glass substrate, and in the resin layer, metal wiring lines, which form power supply lines, are buried. Therefore, in Examples 3-4 to 3-6 as well, the resistance values of the power supply lines are reduced, and in addition, a uniform cell gap can be achieved.

Now, a producing method of the buried wiring structure is specifically described with reference to FIG. 13.

Figure 26:
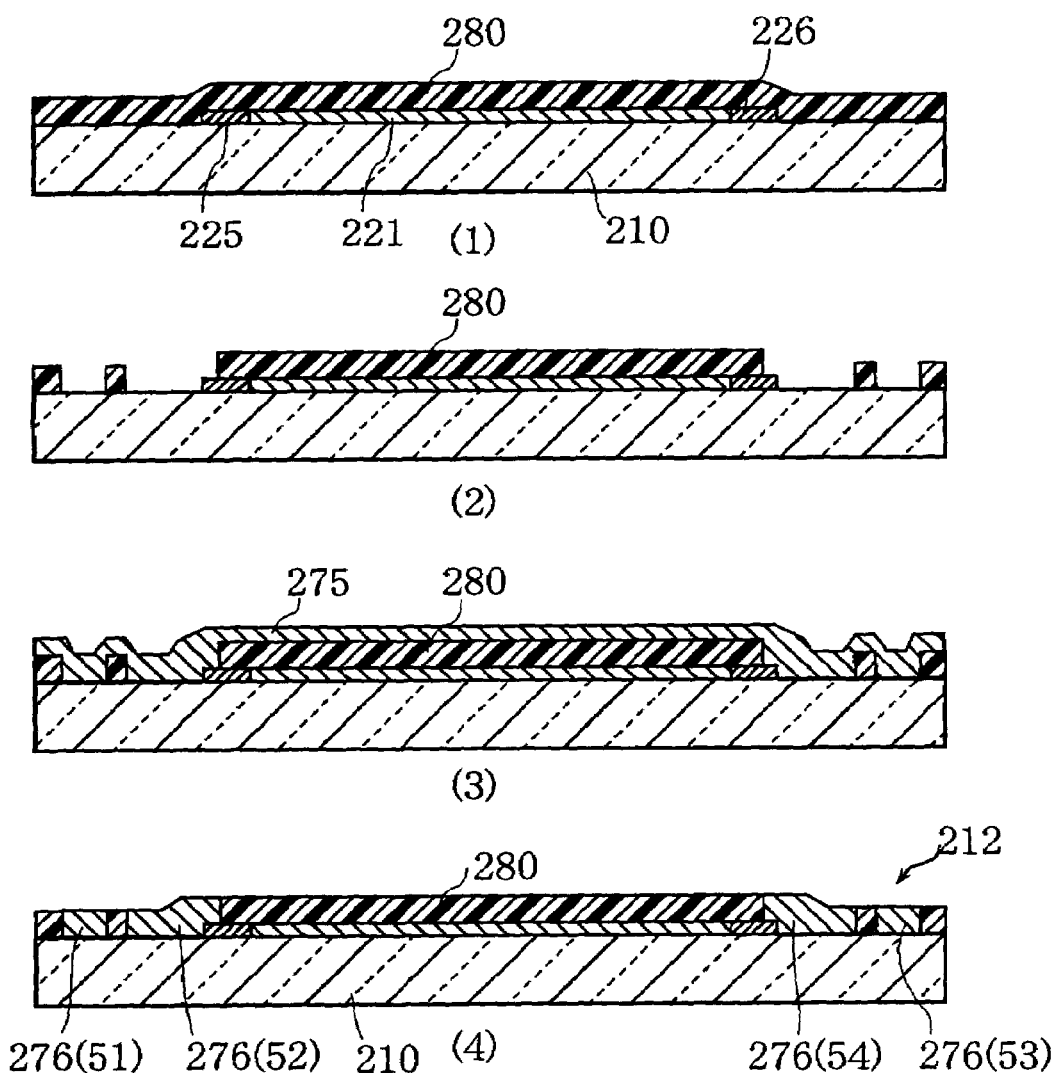
FIGS. 26(1) to 26(4) show a production process of an array substrate of Example 3-3.

(1) First, as shown in FIG. 26(1), an active matrix pattern (corresponding to the liquid crystal display unit 221) including pixel electrodes, and a peripheral pattern (driver circuits 224–226) are formed, and thereafter, a photosensitive acrylic resin 280 is applied on the entire surface of the glass substrate 210 by, for example, spin coating, so as to have a film thickness of 1500 nm.

(2) Next, as shown in FIG. 26(2), by carrying out exposure and alkaline development, a pattern is formed so that grooves for common wiring lines including power supply lines are formed in the periphery of the driver circuit sections. The entire substrate is exposed (g, h, or i ray light source at 300 mJ) to bleach the photosensitive acrylic resin to make it transparent. The g, h, or i rays refer to bright line spectrums of a mercury lamp for exposure each having a certain wavelength. Considering the efficiency, it is preferable to use i rays, which exhibits the strongest energy.

(3) Next, as shown in FIG. 26(3), a metal layer 75 composed of Al, which is to be buried in the resin 280, is formed by sputtering, so as to have a thickness of 1500 $\mu$m.

(4) Next, as shown in FIG. 26(4), the etching is removed so that the deposited metal layer 275 remains as a common electrode wiring pattern including power supply and as a pattern for connecting to the driver circuit. Then, the connecting electrodes 265, 266 and 268, 267 and the insulating layers relating to the connecting electrodes 265, 266 and 268, 267 are formed. Thus, an active matrix substrate 212 in which the power supply lines 251–254 are buried in the resin 280 is produced.

According to the above-described producing process, it is unnecessary to etch the glass substrate 210, and therefore, precision of the processing is further improved, and controllability of the thicknesses of metal wiring lines formed as buried electrodes is also improved.

EXAMPLE 3-4

Figure 27:
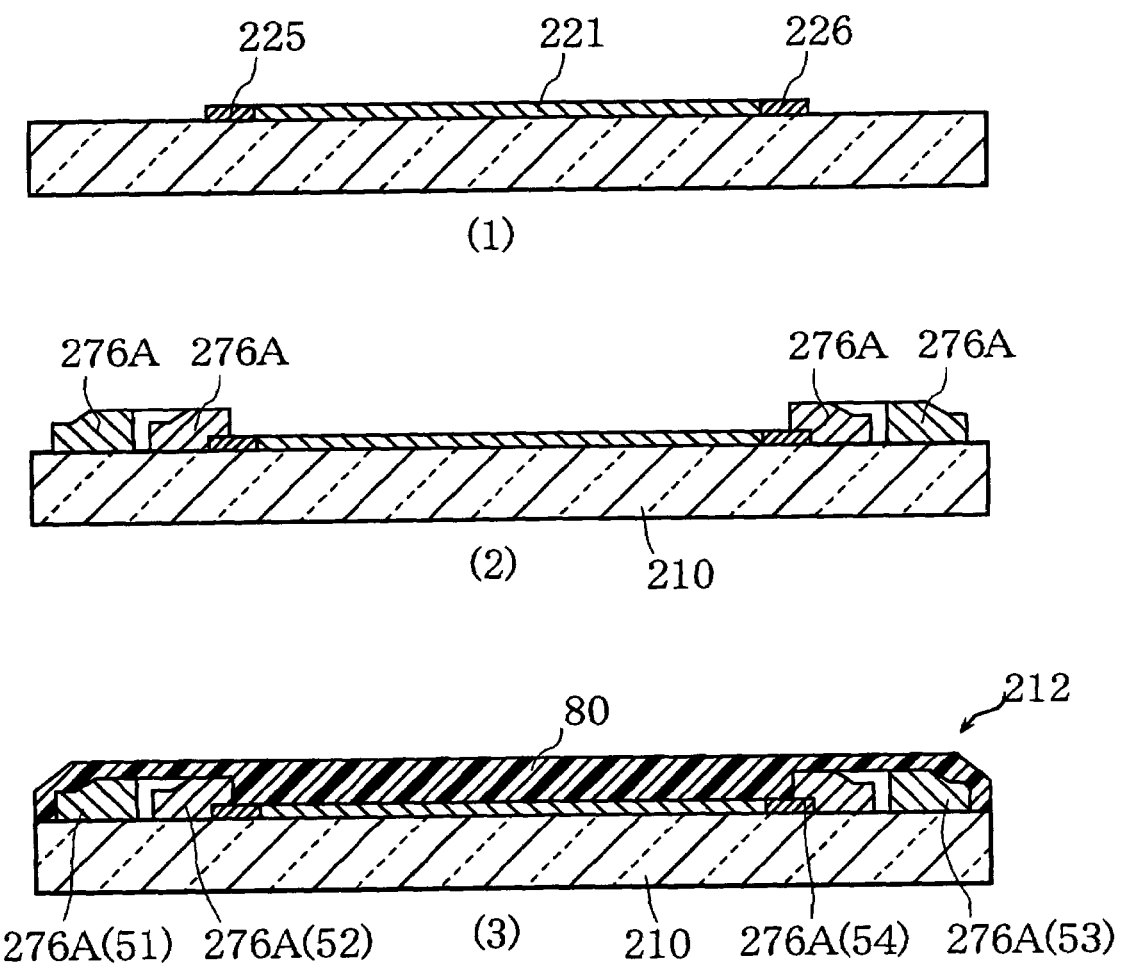
FIGS. 27(1) to 27(3) show a production process of an array substrate of Example 3-4.

FIGS. 27(1) to 27(3) illustrate a producing process of an active matrix substrate of Example 3-4. In Example 3-4, the peripheral wiring pattern is formed by screen printing. Specific details of the producing process are as follows.

(1) First, as shown in FIG. 27(1), an active matrix pattern including pixel electrodes (liquid crystal display unit 221) and a peripheral pattern for driving the liquid crystal panel (driver circuits 224–226) are formed on the glass substrate 210, and thereafter, for a common wiring section including power supplies, an electrically conductive thermosetting resin is screen printed to form a metal layer 276A that corresponds to the power supply lines 252 and 254 and to the connecting electrodes 265 and 268. Next, an insulting layer (not shown) is formed on the metal layer 276A, and subsequently, a metal layer 276A that corresponds to the power supply lines 251 and 253 and to the connecting electrodes 265 and 268. This prevents a portion of the metal layer 276A corresponding to the connecting electrode 266 from making contact with a portion of the metal layer 276A corresponding to the power supply line 252. Likewise, this also prevents a portion of the metal layer 276A corresponding to the connecting electrode 267 from making contact with a portion of the metal layer 276A corresponding to the power supply line 254.

(2) Next, as shown in FIG. 27(2), after the screen printing, the conductive resin 276A is heated at a temperature of 150–180° C. to cure the resin. The temperature for curing the resin should be adjusted depending on types of the resin.

(3) Next, as shown in FIG. 27(3), after the wiring lines have been formed, an insulative resin 280 is similarly screen printed so as to be buried between the wiring lines, in order to planarize the surface.

By employing a screen printing method as described above, the time required for forming a pattern is reduced. In addition, the costs for producing apparatuses are very low in comparison to a photolithography method, and therefore, this technique is particularly suitable for such cases with a long power supply line, such as an active matrix substrate for large-sized liquid crystal display panels. Although not superior to a photolithography method in terms of the precision of the processing, this technique is effective for wiring patterns that do not require high precision such as those for power supply lines.

The forming of a planarizing film may be carried out by a spin coating method, other than the screen printing. Thus, the above-described process makes it possible to easily form wiring lines having a thickness of 1 μm or larger.

EXAMPLE 3-5

FIG. 15 illustrates a producing process of an active matrix substrate of Example 3-5. In Example 3-5, a metal fine wire 281 is used for the material of the metal wiring lines, and the metal fine wire is buried. In the present example, the diameter of the metal fine wire is 50 μm.

Specific details of the producing process are as follows.

Figure 28:
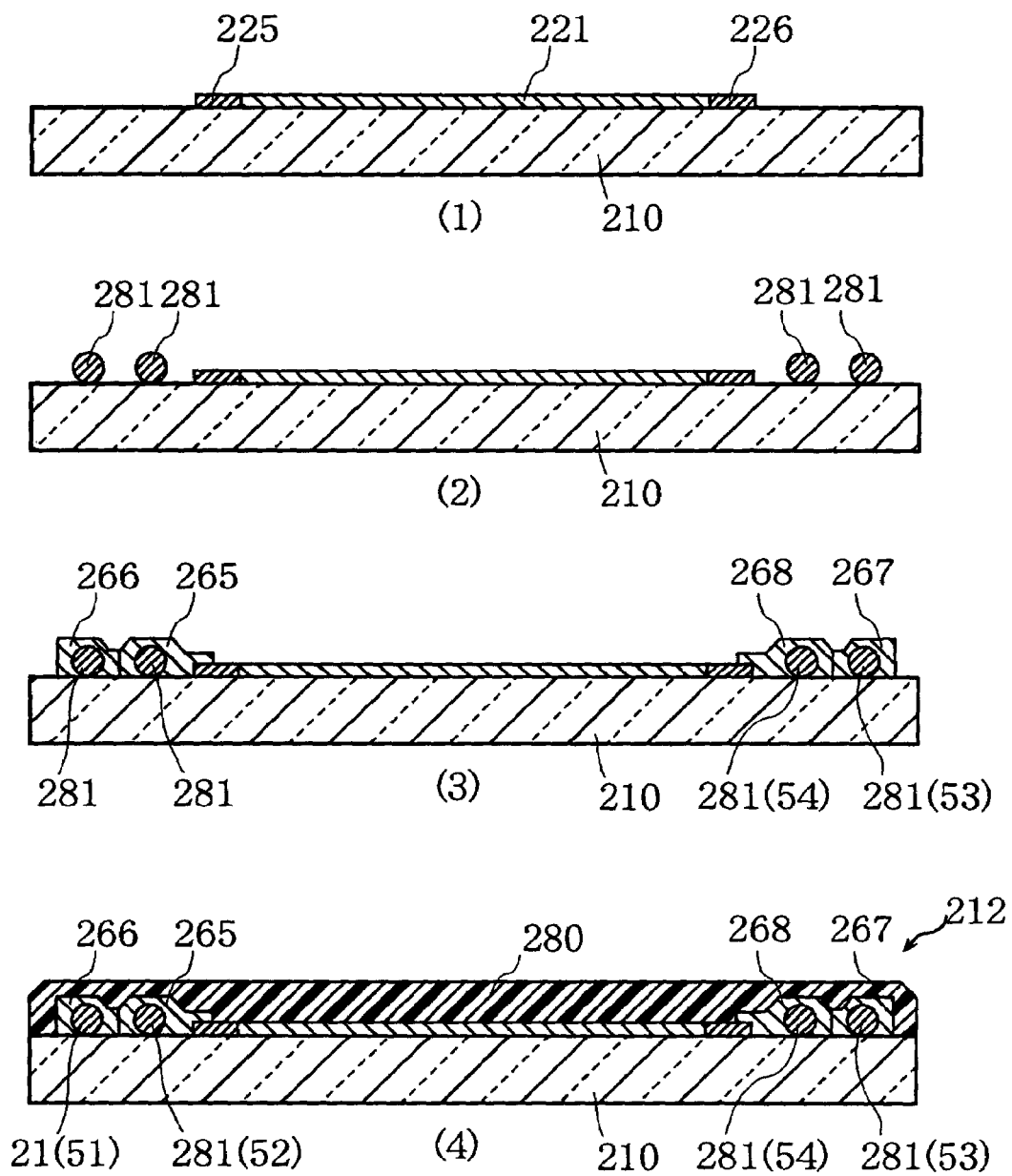
FIGS. 28(1) to 28(4) show a production process of an array substrate of Example 3-5.

(1) First, as shown in FIG. 28(1), an active matrix pattern including pixel electrodes (liquid crystal display unit 221) and a peripheral pattern for driving the liquid crystal panel (driver circuits 224–226) are formed on the glass substrate.

(2) Next, as shown in FIG. 28(2), metal fine wires 281, corresponding to power supply lines, each having a diameter of 50 μm are formed in the peripheral portion of the glass substrate 210.

(3) Next, as shown in FIG. 28(3), connecting electrodes 265–268 for connecting the metal fine wires 281 and the driver circuits 225, 226 are formed. Between the connecting electrode 266 and the metal wiring line 281 corresponding to the power supply line 252, an insulating layer is formed, and likewise, between the connecting electrode 268 and the metal wiring line 281 corresponding to the power supply line 251, an insulating layer is formed.

(4) Next, as shown in FIG. 28(4), an insulative resin 280 is screen printed so as to be buried between the wiring lines, in order to planarize the surface.

It is noted that in addition to a screen printing method, a spin coating method may be employed to form a planarizing film.

Figure 29:
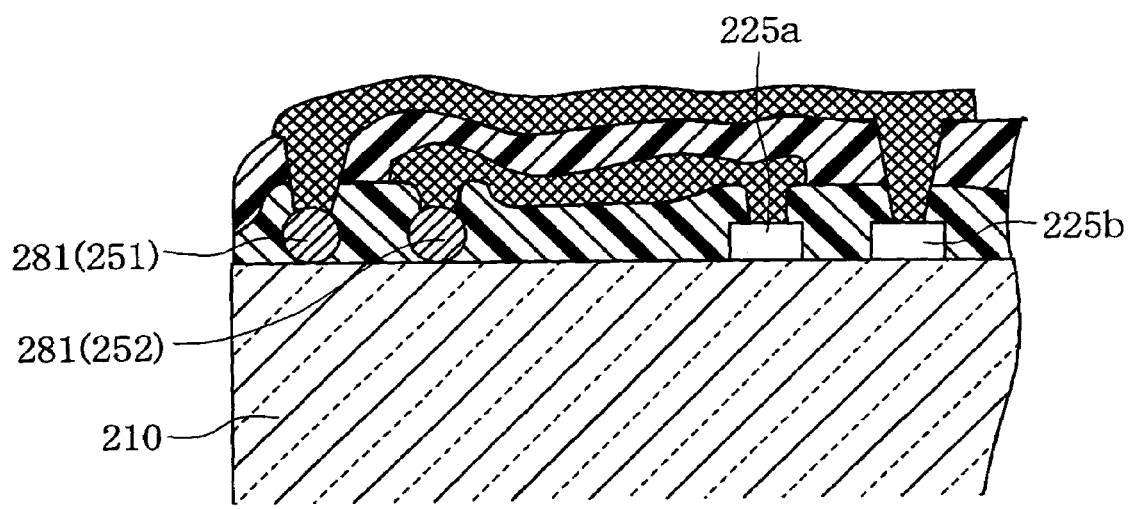
FIG. 29 shows a variation of the connecting configuration between metal fine wires and a driver circuit.

In addition, as shown in FIG. 29, the power supply lines 251 and 252 are connected to the power supply electrode pads 225a and 225b via the connecting electrodes 265 and 266 in such a manner as shown in FIG. 29 that the connecting electrodes 265 and 266 are extended from the same positions of the power supply lines 251 and 252.

Suitable materials for the metal fine wiring line 281 include Ti, Cr, and gold, and, when such materials are employed, further reduction in the resistance values is possible.

As is described above, Example 3-5 eliminates the step of forming a wiring pattern by employing pre-formed metal fine wires, reducing the number of production steps. In addition, by varying the diameter of the metal fine wires, the resistance value of a power supply line can be determined. Accordingly, by selecting a metal fine wire having a predetermined resistance value, a desired resistance value can be obtained. Therefore, alterations of the resistance value are easy. Furthermore, the production cost is low.

EXAMPLE 3-6

Figure 30:
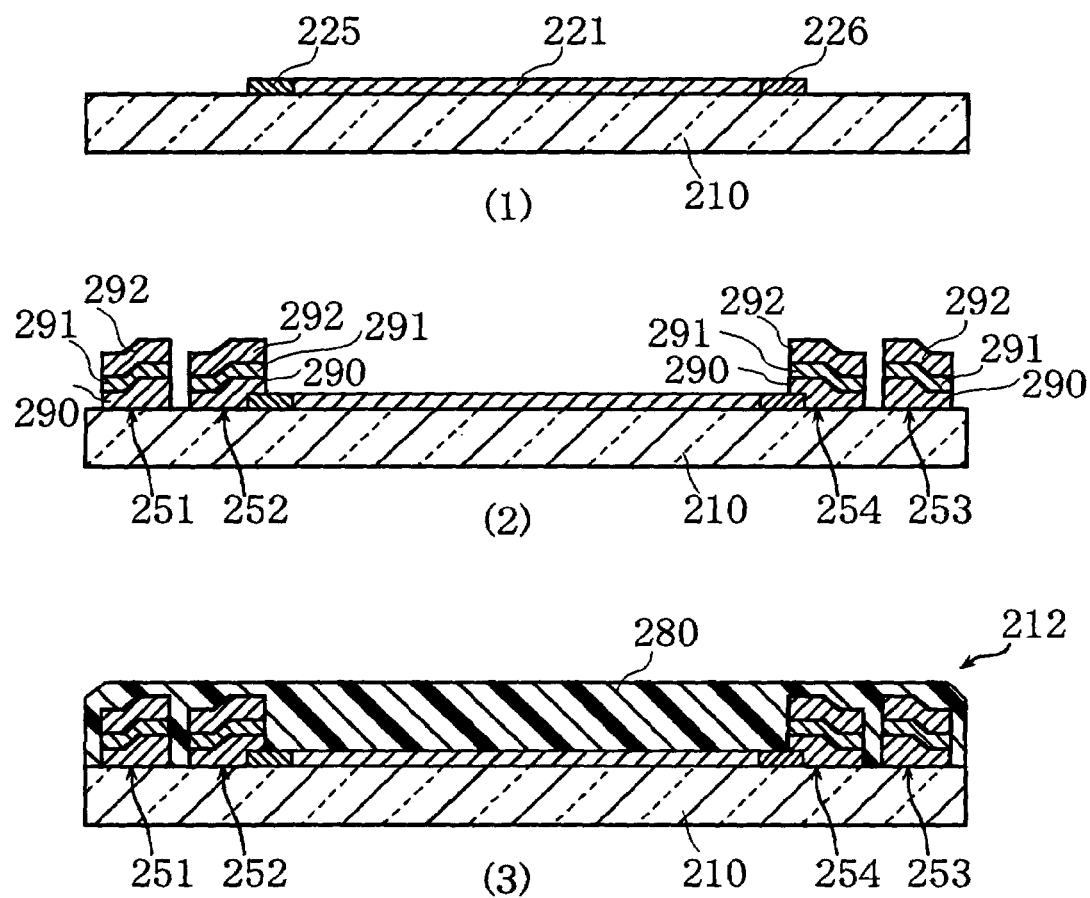
FIGS. 30(1) to 30(3) show a production process of an array substrate of Example 3-6.
Figure 31:
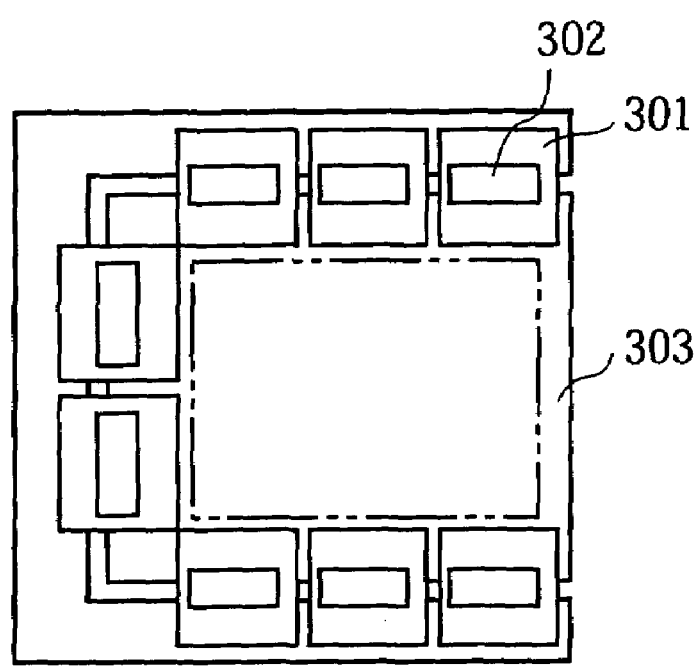
FIG. 31 is a plan view showing the configuration of a prior-art liquid crystal display device made using a tape carrier package.
Figure 32:
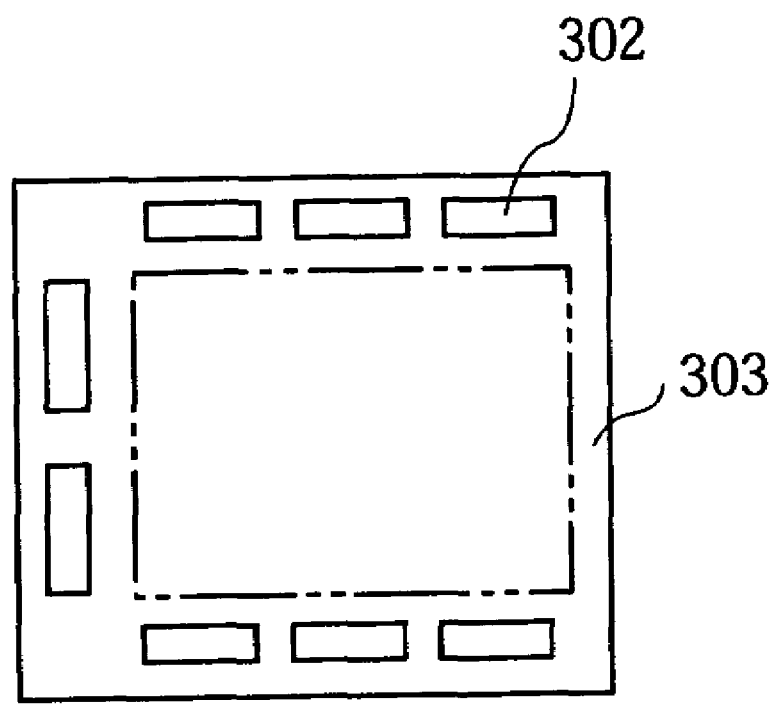
FIG. 32 is a plan view showing the configuration of a prior-art liquid crystal display device produced using a chip on glass technique.
Figure 33:
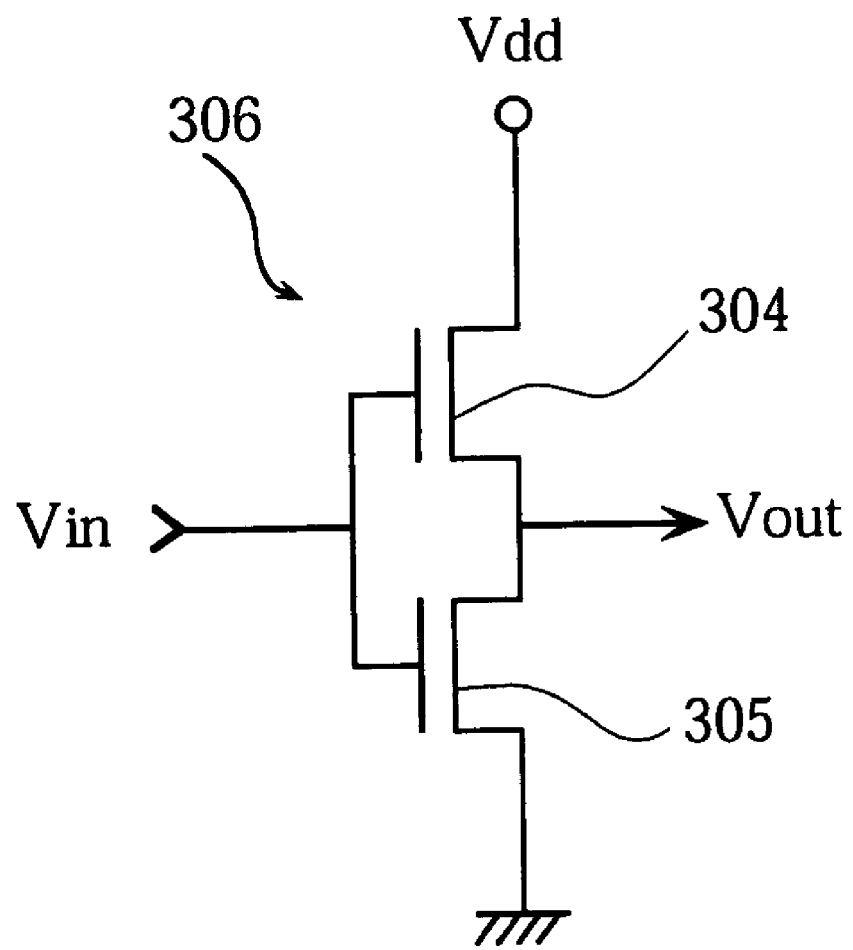
FIG. 33 is a circuit diagram showing the configuration of a CMOS inverter.
Figure 35:
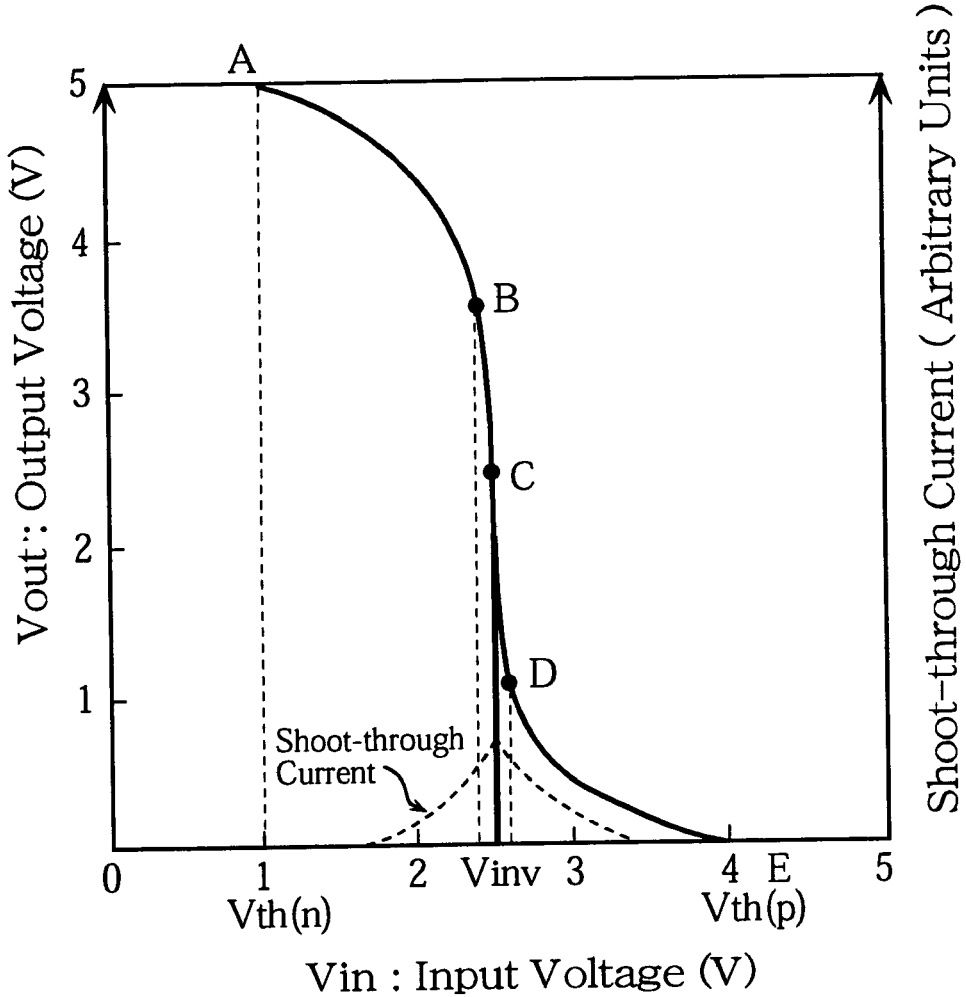
FIG. 35 is a graph showing magnitudes of shoot-through currents in a CMOS inverter using polycrystalline silicon thin film transistors.
Figure 36:
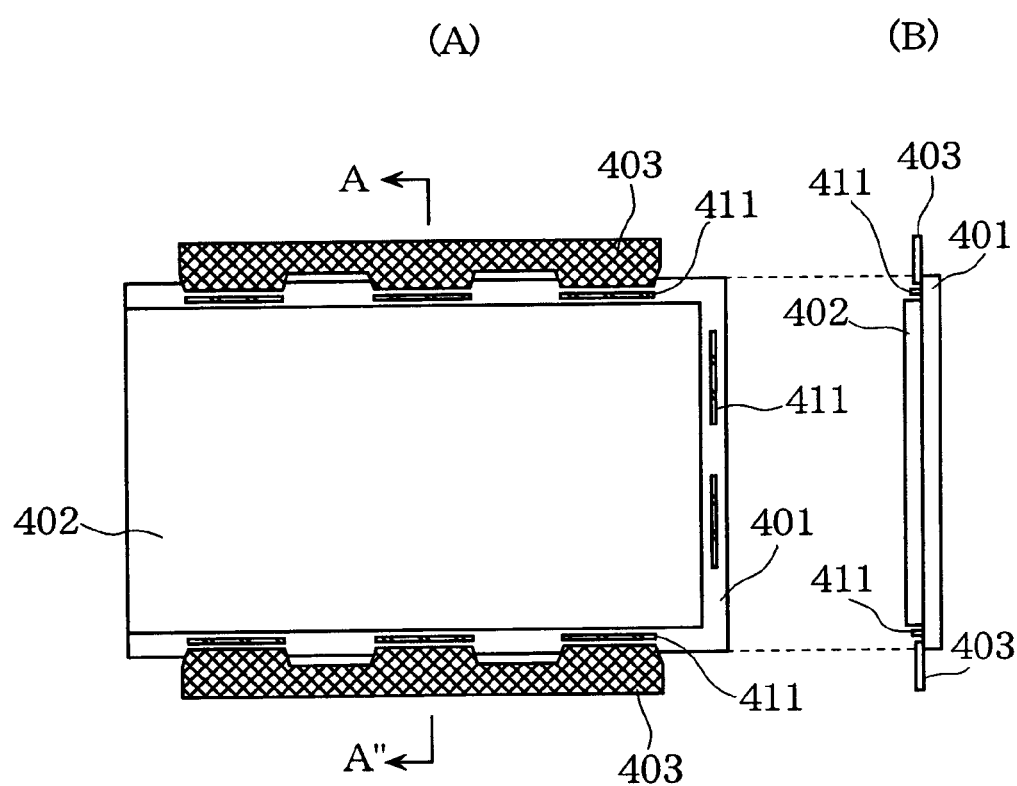
FIGS. 36(A) and 36(B) are a plan view and a side view of a prior art liquid crystal display device in which an amorphous silicon thin film and driver ICs are connected using a flip chip technique.
Figure 37:
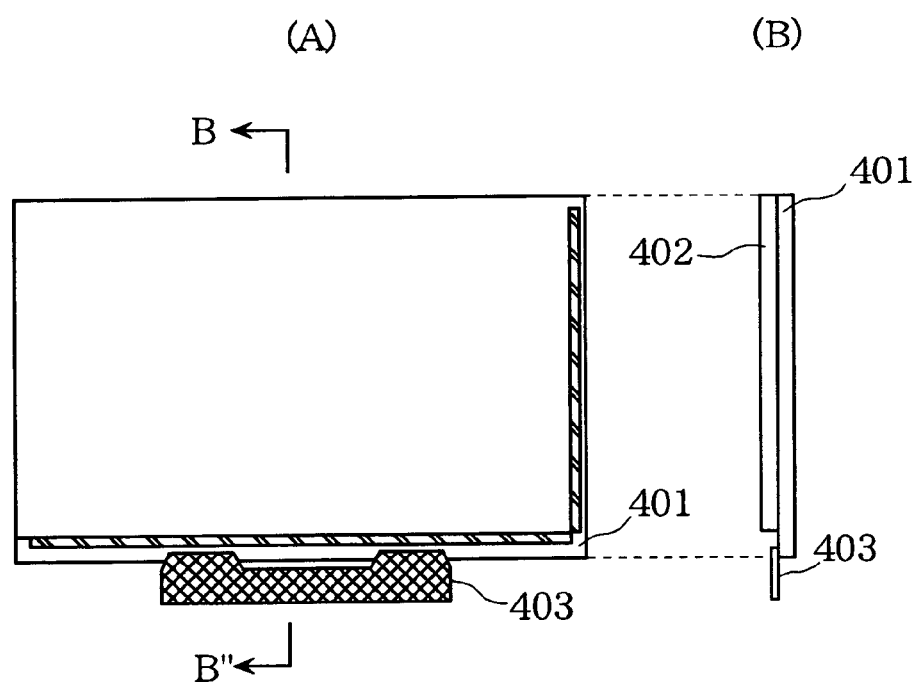
FIGS. 37(A) and 37(B) are a plan view and a side view of a prior art liquid crystal display device with polycrystalline silicon thin film transistors.

FIGS. 30(1) to 30(3) illustrate a production process of an active matrix substrate of Example 3-6. In Example 3-6, a thick film for bus lines is formed on a peripheral region of the glass substrate 210 on which an active matrix array is formed, using a plating process. By using a plating process, a layered wiring line structure including a low resistance metal can be formed, and as a result, further reduction in the power supply line resistance is achieved. It is noted that, between the driver circuits 225, 226 and the portions of the copper foil layer 290 disposed to be the lowermost layer of the metal wiring thick film which corresponds to the power supply lines 252 and 254, an insulating layer in which the portions corresponding to the connecting electrodes 265 and 268 are incised (not shown) is interposed. On a gold-nickel plating layer 292, which is positioned to be the uppermost layer of the metal wiring thick film, an insulating layer (not shown) is formed. The insulating layer on the portions of the nickel plating layer 292 that correspond to the power supply lines 251 and 253 has contact holes formed therein, and via the contact holes, the connecting electrodes 266 and 267 are connected to the driver circuits 225 and 226. Thus, the connecting electrodes 266 and 267 are prevented from making contact with the portions of the gold-nickel plating layer 292 which correspond to the power supply lines 252 and 254.

Specific details of the production method are as follows.

(1) First, as shown in FIG. 30(1), an active matrix pattern including pixel electrodes (liquid crystal display unit 221) and a peripheral pattern (driver circuits 224–226) are formed on a glass substrate 210.

(2) Next, as shown in FIG. 30(2), a copper foil layer 290, a copper plating layer 291, and a gold-nickel plating layer 292 are layered to form a metal wiring line layer 276 having a thickness of, for example, 1 μm or more, serving as a common wiring line section including power supply lines. Specifically, using a photolithography method, a resist pattern is formed except on the portions where an undercoat metal is to be formed. Next, a copper thin film, serving as an undercoat metal, is formed. Next, by lift off, unnecessary portions are removed. Next, using the remaining copper thin film as an undercoat layer, the substrate is dipped in a plating bath of a solution mainly composed of copper sulfate so that copper is plated on the undercoat thin film in a self-alignable manner. Thus, a copper plating layer 291 is formed on the copper foil layer 290. Further, using a like plating method, a gold-nickel plating layer 292 is formed on the copper plating layer 291.

(3) Next, after the connecting electrodes 266 and 267 (not shown), an insulating layer (not shown), and so forth have been formed, as shown in FIG. 30(3), an insulative resin 280 is screen printed between the wiring lines to planarize the surface.

Suitable materials for the plating include, other than the examples mentioned above, nickel plating, chromium plating, and aluminum plating. The plating of alloys thereof is also possible.

In the present example, by employing a plating method, it is possible to form metal wiring lines on an undercoat metal film in a self-alignable manner. In addition, for the metal to be formed on the undercoat metal film in a self-alignable manner, it is possible to employ a low resistance metal such as gold, copper, or the like, and by selecting an appropriate undercoat metal, low resistance and high precision in the metal wiring lines can be achieved.

Supplementary Remarks for Examples 3-1 to 3-6

(1) In Examples 3-1 to 3-6 above, the buried wiring structure is employed for the power supply lines, but the present invention is not limited thereto, and the buried wiring structure is applicable to other bus lines, such as data lines and clock lines for shift registers, in which signal delay caused by wiring line resistance is a problem.

(2) In Examples 3-1 to 3-4 above, the metal wiring layer may be formed in the following manner; a conductive layer composed of a thin film is formed beforehand, and on the conductive layer, metal wiring lines are formed by selective depositing. By doing so, metal wiring lines can be formed in a self-alignable manner as in the cases of the foregoing plating method, and it is possible to form low-resistance metal wiring lines by selecting a metal to be deposited. In the case of a selective depositing method, the process is carried out in a cleaner environment than in the case of a plating method. Therefore, impurities do not mix in the metal wiring lines, and the precision of the resistance value of the metal wiring lines is improved.

(3) The present embodiment describes a liquid crystal display device as an example, but the present invention is similarly applicable to a display device having a light emission type matrix panel, such as plasma discharge panels (PDP) and electro-luminescent (EL) displays.

INDUSTRIAL APPLICABILITY

As has been described above, the present invention can sufficiently accomplish the objects of the invention. Specifically, the following are achieved.

(1) A resin substrate having a bus line is provided in a peripheral portion of an array substrate, and the bus line is connected to an individually-wired line array, which is connected to a driver circuit, via a via hole in the resin substrate. This achieves the formation of a low resistance bus wiring line. In addition, a connecting terminal, which can be connected to an external circuit, is provided at a part of the bus line, which achieves a reduction in the sizes and thicknesses of the flexible wiring board or the printed wiring board.

(2) In addition to the above advantages, a multi-layer wiring line-equipped section for a bus line is provided on a thin film wiring region including a driver circuit section composed of polycrystalline silicon thin film transistors by printing, and thereby, the bus line can be easily formed at desired regions.

(3) The bus lines for driver circuits have a buried wiring structure, and thereby wiring line resistance of power supply lines for applying power supply voltage to the driver circuits are easily reduced. Therefore, a shoot-through current in the semiconductor elements in the driver circuits and a voltage drop caused by wiring line resistance of the power supply lines are minimized, which ensures a reliable operation of the device. Accordingly, a remarkable size reduction of the integrated driver circuit section is possible, and a driver circuit-integrated type liquid crystal display device having a narrow frame is realized.

What is claimed is:

1. A display device comprising:
   an active matrix substrate having a peripheral portion and a driver circuit section comprising a plurality of circuit elements and a plurality of polycrystalline silicon thin film transistors;
   a counter substrate;
   a liquid crystal material filled between the active matrix substrate and the counter substrate; and
   an individually-wired line array for supplying a clock signal, a data signal or electric power to the plurality of circuit elements in the driver circuit section, wherein the individually-wired line array is extended to the peripheral portion of the active matrix substrate, wherein:
   the peripheral portion of the active matrix substrate comprises a multi-layer bus line-equipped section having a bus line located on the insulator, the bus line is connected to the individually-wired line array via the via hole, and the bus line comprises a connecting terminal for connecting the display device to an external circuit; and
   the insulator is a pre-formed resin substrate having a bus line located on a surface thereof and a via hole in the substrate.

2. The display device according to claim 1, wherein the resin substrate comprising an aramid-epoxy resin.

3. The display device according to claim 1, wherein the via hole is filled with electrically conductive paste.

4. The display device according to claim 1, wherein the resin substrate is a multi-layer structure comprising a plurality of layers in which said bus line is located on a surface of an inner layer thereof as well as on a surface of the outermost layer thereof, and the bus lines are selectively connected to each other via a via hole in each of the layers to form a three-dimensional wiring structure.

5. The display device according to claim 3, wherein the electrically conductive paste partially protrudes from a lower opening of the via hole, and the active matrix substrate and the resin substrate are bonded together with the protruding portion of the electrically conductive paste.

6. The display device according to claim 4, wherein an electrically conductive paste fills the via hole; the electrically conductive paste protrudes from a lower opening of the via hole; and the electrically conductive paste partially protrudes from the opening of the via hole, and the active matrix substrate and the resin substrate are bonded together with the protruding portion of the electrically conductive paste.

7. The display device according to claim 1, wherein the resin substrate and the active matrix substrate are bonded with an adhesive comprising a material having a thermoplastic property.

8. The display device according to claim 1, wherein the resin substrate and the active matrix substrate are bonded with an adhesive comprising an anisotropic conductive resin or a silver paste.

9. The display device according to claim 1, wherein the resin substrate is a film substrate, and is detachably bonded to the active matrix substrate.

10. The display device according to claim 9, wherein the film substrate is made of a resin comprising polyimide or epoxy.

11. The display device according to claim 1, further comprising a semiconductor chip of an external circuit, said semiconductor chip being mounted on the resin substrate and is connected to the bus line.

12. The display device according to claim 11, wherein the semiconductor chip is buried in the via hole.

13. The display device according to claim 1, wherein the bus line in the multi-layer bus line-equipped section is a thick film.

14. The display device according to claim 13, wherein the insulator in the multi-layer bus line-equipped section is a thick film.

15. A display device comprising:
an active matrix substrate having a peripheral portion and a driver circuit section comprising a plurality of circuit elements and a plurality of polycrystalline silicon thin film transistors;
a counter substrate;
a liquid crystal material filled between the active matrix substrate and the counter substrate; and
an individually-wired line array for supplying a clock signal, a data signal or electric power to the plurality of circuit elements in the driver circuit section, wherein the individually-wired line array is extended to the peripheral portion of the active matrix substrate, wherein:
the active matrix substrate has a recessed groove located in the peripheral portion;
a bus line connected to the individually-wired line array is buried in the groove, the bus line is a layered structure comprising a copper foil layer, a copper plating layer, and a gold-nickel plating layer.

16. A display device comprising:
an active matrix substrate having a peripheral portion and a driver circuit section comprising a plurality of circuit elements and a plurality of polycrystalline silicon thin film transistors;
a counter substrate;
a liquid crystal material filled between the active matrix substrate and the counter substrate; and
an individually-wired line array for supplying a clock signal, a data signal or electric power to the plurality of circuit elements in the driver circuit section, wherein the individually-wired line array is extended to the peripheral portion of the active matrix substrate, wherein:
the active matrix substrate comprises an organic resin layer in the peripheral portion thereof, a connecting electrode, and a bus line connected to the individually-wired line array and buried in the organic resin layer;
the organic resin comprises a photosensitive resin;
the organic resin layer has a via hole formed by photolithography; and
the bus line is electrically connected to the individually wired line array via the connecting electrode located in the via hole.

17. The display device according to claim 16, wherein the bus line is an electrically conductive thermosetting resin.

18. The display device according to claim 15, wherein the bus line is a pre-formed metal fine wire.

19. The display device according to claim 16, wherein the bus line is a pre-formed metal fine wire.

20. The display device according to claim 16, wherein the bus line is produced by plating.

21. The display device according to claim 20, wherein the bus line is a layered structure comprising a copper foil layer, a copper plating layer, and a gold-nickel plating layer.

22. The display device according to claim 15, wherein the bus line is formed by depositing in which a thin, electrically conductive layer is formed in advance and a plurality of different metal layers are selectively deposited on the electrically conductive layer.

23. The display device according to claim 16, wherein the bus line is formed by depositing in which a thin, electrically conductive layer is formed in advance and a plurality of different metal layers are selectively deposited on the electrically conductive layer.

24. The display device according to claim 1, wherein, in place of the liquid crystal, a rare gas is located between the substrates, the rare gas for forming a plasma discharge to perform a display operation.

* * * * *

UNITED STATES PATENT AND TRADEMARK OFFICE
CERTIFICATE OF CORRECTION

| | | |
|---|---|---|
| PATENT NO. | : 6,961,111 B1 | Page 1 of 1 |
| APPLICATION NO. | : 09/831315 | |
| DATED | : November 1, 2005 | |
| INVENTOR(S) | : Keizaburo Kuramasu et al. | |

It is certified that error appears in the above-identified patent and that said Letters Patent is hereby corrected as shown below:

On the title page, column 1, section (75), add inventor --Yutaka Nanno, Takarazuka (JP)--.
On the title page, column 2, section (56), add Other Documents subsection, add citation -- Inoue et al. "4.2: Low-Temperture Poly-Si TFT-LCD with Integrated 6-bit Digital Data Drivers," 1996, pages 21-24--.
In claim 2, column 26, line 16, replace "comprising" with --comprises--.

Signed and Sealed this

Nineteenth Day of September, 2006

JON W. DUDAS
*Director of the United States Patent and Trademark Office*